United States Patent
Bampis et al.

(10) Patent No.: US 12,555,201 B2
(45) Date of Patent: Feb. 17, 2026

(54) TECHNIQUES FOR COMPONENT-BASED IMAGE PREPROCESSING

(71) Applicant: NETFLIX, INC., Los Gatos, CA (US)

(72) Inventors: Christos G. Bampis, Los Gatos, CA (US); Li-Heng Chen, Austin, TX (US); Aditya Mavlankar, San Francisco, CA (US); Anush Moorthy, Redwood City, CA (US)

(73) Assignee: NETFLIX, INC., Los Gatos, CA (US)

( * ) Notice: Subject to any disclaimer, the term of this patent is extended or adjusted under 35 U.S.C. 154(b) by 377 days.

(21) Appl. No.: 17/551,087

(22) Filed: Dec. 14, 2021

(65) Prior Publication Data

US 2023/0186435 A1    Jun. 15, 2023

(51) Int. Cl.
*G06T 5/70* (2024.01)
*G06T 3/40* (2006.01)
*G06T 7/90* (2017.01)

(52) U.S. Cl.
CPC .............. *G06T 5/70* (2024.01); *G06T 3/40* (2013.01); *G06T 7/90* (2017.01); *G06T 2207/10024* (2013.01); *G06T 2207/20081* (2013.01)

(58) Field of Classification Search
CPC .... G06T 5/70; G06T 3/40; G06T 7/90; G06T 2207/10024; G06T 2207/20081; H04N 19/85
See application file for complete search history.

(56) References Cited

U.S. PATENT DOCUMENTS

| | | | |
|---|---|---|---|
| RE48,740 E * | 9/2021 | Thompson | H04N 19/88 |
| 11,563,986 B1 * | 1/2023 | Bampis | G06N 3/045 |
| 12,183,013 B1 * | 12/2024 | Yang | G06V 10/764 |
| 12,231,666 B2 * | 2/2025 | Egilmez | H04N 19/172 |
| 12,238,343 B2 * | 2/2025 | Ma | G06N 3/08 |
| 12,335,539 B2 * | 6/2025 | Dumas | H04N 19/88 |
| 2013/0038626 A1 * | 2/2013 | Feda | H04N 9/646 345/617 |

(Continued)

FOREIGN PATENT DOCUMENTS

| CN | 112868229 A | 5/2021 |
|---|---|---|
| WO | 2022/106013 A1 | 5/2022 |

OTHER PUBLICATIONS

Notice of Allowance received for U.S. Appl. No. 17/551,086 dated Sep. 19, 2022, 13 pages.

(Continued)

*Primary Examiner* — Aaron W Carter
(74) *Attorney, Agent, or Firm* — Artegis Law Group, LLP

(57) ABSTRACT

In various embodiments, an image preprocessing application preprocesses images. To preprocess an image, the image preprocessing application executes a trained machine learning model on first data corresponding to both the image and a first set of components of a luma-chroma color space to generate first preprocessed data. The image preprocessing application executes at least a different trained machine learning model or a non-machine learning algorithm on second data corresponding to both the image and a second set of components of the luma-chroma color space to generate second preprocessed data. Subsequently, the image preprocessing application aggregates at least the first preprocessed data and the second preprocessed data to generate a preprocessed image.

21 Claims, 7 Drawing Sheets

(56) References Cited

U.S. PATENT DOCUMENTS

| | | | |
|---|---|---|---|
| 2015/0245042 A1* | 8/2015 | Thompson | H04N 19/85 382/166 |
| 2015/0249829 A1* | 9/2015 | Koat | H04N 19/61 375/240.03 |
| 2016/0269733 A1* | 9/2016 | Tourapis | H04N 19/85 |
| 2017/0134731 A1* | 5/2017 | Tourapis | H04N 19/13 |
| 2019/0347847 A1* | 11/2019 | Elgharib | G06T 15/205 |
| 2020/0126187 A1* | 4/2020 | Park | H04N 19/85 |
| 2020/0134797 A1* | 4/2020 | Zhang | H04N 1/6008 |
| 2021/0150812 A1* | 5/2021 | Su | H04N 19/593 |
| 2021/0166348 A1* | 6/2021 | Na | G06N 3/04 |
| 2021/0400306 A1* | 12/2021 | Xu | H04N 19/1883 |
| 2022/0058783 A1* | 2/2022 | Kadu | H04N 19/132 |
| 2022/0086463 A1* | 3/2022 | Coban | H04N 19/136 |
| 2022/0109860 A1* | 4/2022 | Chen | G06N 3/04 |
| 2022/0191523 A1* | 6/2022 | Egilmez | H04N 19/50 |
| 2022/0272355 A1* | 8/2022 | Singh | H04N 23/632 |
| 2022/0286695 A1 | 9/2022 | Li et al. | |
| 2022/0303557 A1* | 9/2022 | Gonsalves | H04N 19/85 |
| 2022/0400273 A1* | 12/2022 | Lin | H04N 19/50 |
| 2023/0065862 A1* | 3/2023 | Karabutov | G06V 10/761 |
| 2023/0069953 A1* | 3/2023 | Chen | H04N 19/50 |
| 2023/0096567 A1* | 3/2023 | Nalci | H04N 19/147 375/240.03 |
| 2023/0186435 A1* | 6/2023 | Bampis | G06T 5/70 382/254 |
| 2023/0336736 A1* | 10/2023 | Gao | H04N 19/172 |
| 2023/0336759 A1* | 10/2023 | Ikonin | G06N 3/045 |
| 2023/0336776 A1* | 10/2023 | Gao | H04N 19/59 |
| 2023/0353764 A1* | 11/2023 | Ikonin | G06N 3/045 |
| 2024/0037802 A1* | 2/2024 | Solovyev | G06T 9/002 |

OTHER PUBLICATIONS

International Search Report for application No. PCT/US2022/081139 dated Mar. 16, 2023.

Dumitras et al., "Fast and High Performance Image Subsampling Using Feedforward Neural Networks", IEEE Transactions on Image Processing, vol. 9, No. 4, Apr. 2000, pp. 720-728.

Egilmez et al., "Transform Network Architectures for Deep Learning Based End-to-End Image/Video Coding in Subsampled Color Spaces", DOI: 10.1109/OJSP.2021.3092257, vol. 2, Jun. 24, 2021, pp. 441-452.

Ma et al., "A Study of Deep Image Compression for YUV420 Color Space", DOI: 10.1117/12.2593500, vol. 11842, Aug. 2021, 8 pages.

Li et al., "Learning a Convolutional Neural Network for Image Compact-Resolution", IEEE, DOI: 10.1109/TIP.2018.2872876, vol. 28, No. 3, Mar. 2019, pp. 1092-1107.

International Search Report for application No. PCT/US2022/081140 dated Apr. 11, 2023.

Abbass et al., "Image Super Resolution Based On Residual Dense CNN and Guided Filters", Multimedia Tools and Applications, DOI:10.1007/S11042-020-09824-3, vol. 80, No. 4, 2021, pp. 5403-5421.

Lin et al., "CNN-based Super Resolution for Video Coding Using Decoded Information", International Conference on Visual Communications And Image Processing (VCIP), IEEE, DOI: 10.1109/VCIP53242.2021.9675417, Dec. 5, 2021, 5 pages.

Daniel Aleksandersen, Enable the sharp YUV option for better WebP image, Jul. 7, 2020, https://www.ctrl.blog/entry/webp-sharp-yuv.html, 5 pages.

Mavlankar et al., "AVIF for Next-Generation Image Coding", https://netflixtechblog.com/avif-for-next-generation-image-coding-b1d75675fe4, 45 pages, Feb. 13, 2020.

Andrey Norkin, "Fast algorithm for HDR video pre-processing", Netflix, Inc., 5 pages, 2016.

* cited by examiner

TECHNIQUES FOR COMPONENT-BASED IMAGE PREPROCESSING

BACKGROUND

Field of the Various Embodiments

The various embodiments relate generally to computer science and to video and video encoding technologies and, more specifically, to techniques for component-based image preprocessing.

Description of the Related Art

Efficiently and accurately encoding video data is an important aspect of delivering high-quality videos in real-time. In a typical system, an encoded video is transmitted to the playback device. As the playback device receives the corresponding encoded video data, a video decoder incrementally generates a reconstructed video that is played back via the playback device. To reduce the bitrate and, accordingly, the size of an encoded video, a video encoder usually implements some type of lossy encoding algorithm to eliminate selected information from a source video. In general, eliminating information during video encoding can lead to visual quality impairments or "artifacts" that can reduce the visual quality of a reconstructed video derived from an encoded video.

To reduce visual quality degradation attributable to video encoding, a sequence of one or more preprocessing algorithms can be deployed prior to a lossy encoding algorithm to create a conventional video encoding pipeline. Each of the preprocessing algorithms can be instantiated externally to or embedded within a video encoder that includes the lossy encoding algorithm. In a typical video encoding pipeline, each preprocessing algorithm independently implements a different type of image preprocessing to preemptively eliminate information from images or "frames" that make up a source video in an effort to increase the effectiveness of the lossy encoding algorithm and reduce the overall amount of visual quality degradation resulting from the related encoding operations.

Generally speaking, each type of image preprocessing implements a different strategy for identifying and eliminating less important or distorted information from one or more components of an image. Some common types of image preprocessing operations include, without limitation, chroma subsampling, downscaling, and spatial denoising. Chroma subsampling refers to reducing the resolution of data corresponding to color or "chroma" components, to which the human visual system is less sensitive, in favor of the resolution of data corresponding to a brightness or "luma" component, to which the human visual system is more sensitive. Downscaling refers to equitably reducing the resolution of data corresponding to all image components. Spatial denoising refers to suppressing noise that contaminates images relative to the original objects (e.g., that are filmed, photographed, etc., to generate the images).

One drawback of conventional video encoding pipelines is that the preprocessing algorithms implemented within those pipelines typically are not optimized to reduce the amount of visual quality degradation arising from the aggregated preprocessing operations and/or arising from subsequent encoding operations. In that regard, a given preprocessing algorithm is usually designed and optimized independently of the video encoding pipeline in which the algorithm is eventually implemented and is not altered when deployed with other preprocessing algorithms within the actual pipeline. The current piecemeal approach to designing and optimizing preprocessing algorithms individually can limit the effectiveness of the aggregated preprocessing operations being performed across multiple preprocessing algorithms within a video encoding pipeline, which can unnecessarily increase the number of artifacts in a decoded image and/or increase the severity of those artifacts. For example, when a lossy encoding algorithm encodes a preprocessed video to generate an encoded video having a given bitrate, the overall visual quality of an associated reconstructed video could be sub-optimally low. Conversely, the total number of bits that a lossy encoding algorithm uses to encode a preprocessed video to achieve a given target visual quality level for an associated reconstructed video could be sub-optimally high.

As the foregoing illustrates, what is needed in the art are more effective techniques for preprocessing videos within video encoding pipelines.

SUMMARY

One embodiment sets forth a computer-implemented method for preprocessing images. The method includes executing a first trained machine learning model on first data corresponding to both a first image and a first set of components of a luma-chroma color space to generate first preprocessed data; executing at least one of a second trained machine learning model or a first non-machine learning algorithm on second data corresponding to both the first image and a second set of components of the luma-chroma color space to generate second preprocessed data; and aggregating at least the first preprocessed data and the second preprocessed data to generate a first preprocessed image.

At least one technical advantage of the disclosed techniques relative to the prior art is that the disclosed techniques can be implemented in a video encoding pipeline to mitigate the visual quality reductions typically experienced with conventional video encoding pipelines. In that regard, a trained machine learning model implemented in a video encoding pipeline learns to reduce reconstruction errors when preprocessing data corresponding to at least one component in a luma-chroma color space. The reconstruction errors correlate to decreases in the visual quality of reconstructed images attributable to preprocessing source images within a video encoding pipeline. Thus, with the disclosed techniques, the visual quality of a reconstructed video can be increased for a given bitrate relative to what can be achieved using prior art techniques. Conversely, with the disclosed techniques, the number of bits used when encoding a source video to achieve a given target visual quality can be reduced relative to what can be achieved using prior art techniques. These technical advantages provide one or more technological improvements over prior art approaches.

BRIEF DESCRIPTION OF THE DRAWINGS

So that the manner in which the above-recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
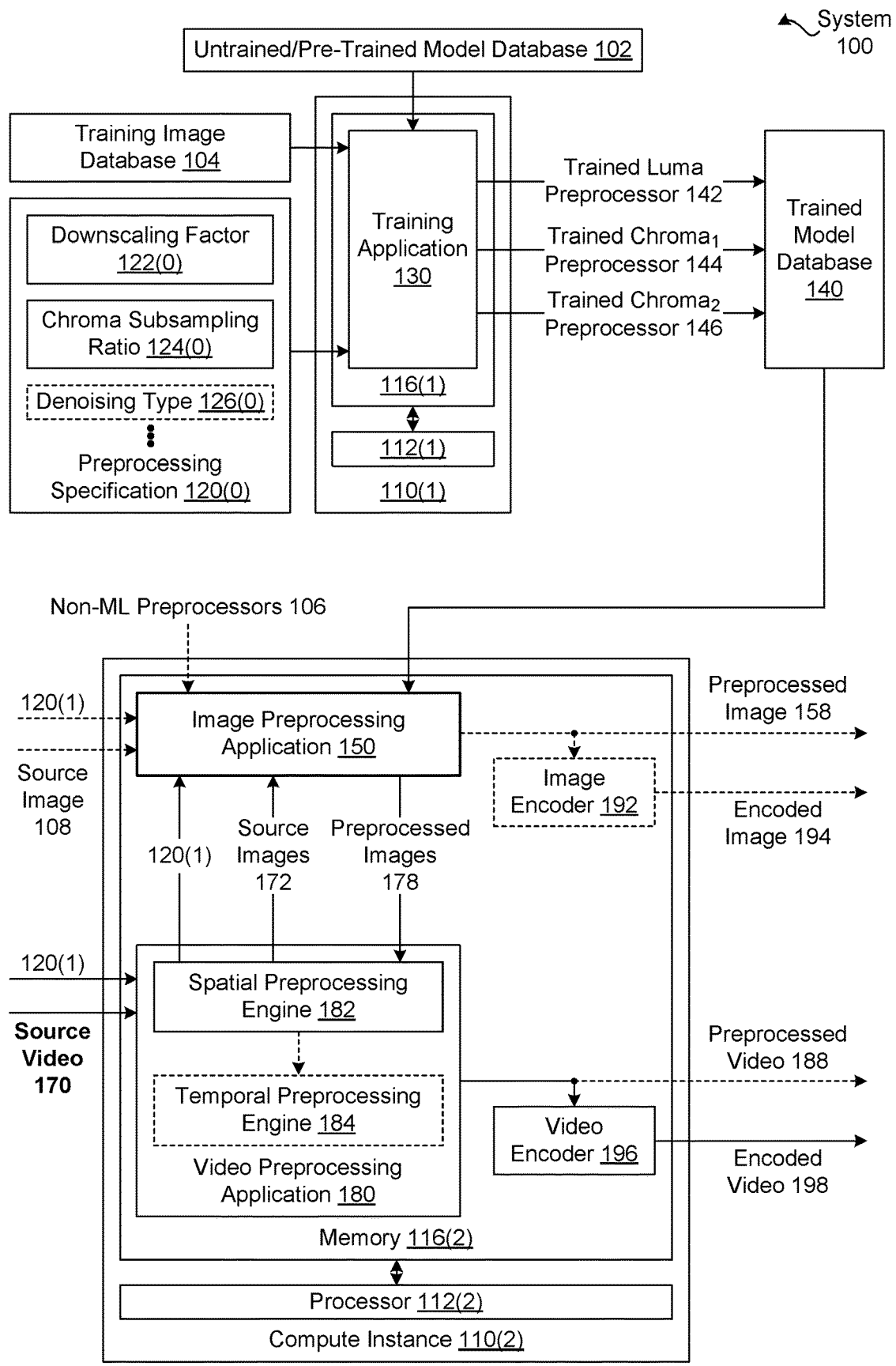
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A typical video streaming service provides access to a library of media titles that can be viewed via different playback devices. To enable real-time delivery of the media titles to playback devices via limited-bandwidth networks, video encoders are configured to execute lossy encoding algorithms that eliminate selected information from corresponding source videos to generate corresponding encoded videos having reduced bitrates. In the context of a media title, a "bitrate" is a total number of bits used to represent the media title divided by the total playback time. To playback a given media title via a given playback device, a corresponding encoded video is streamed to the playback device. As the playback device receives the encoded video data, a video decoder generates a reconstructed video that is played back via the playback device.

For a typical video encoder, as the number of bits used to encode a media title decreases, the visual quality of the reconstructed video also decreases. In an attempt to mitigate visual quality reductions attributable to video encoding, oftentimes one or more types of image preprocessing algorithms are deployed before or at the beginning of a video encoder to generate a conventional video encoding pipeline. Each type of image preprocessing algorithm systematically removes information from the images included in a source video in an effort to increase the effectiveness of the video encoder based on a different strategy. For example, a downscaling algorithm reduces the resolution of data corresponding to all components, a chroma subsampling algorithm reduces the resolution of data corresponding to chroma components, and a spatial denoising algorithm reduces noise.

One drawback of conventional video encoding pipelines is that each preprocessing algorithm is typically designed and optimized independently of the other preprocessing algorithms. Therefore, a preprocessed video generated by the final preprocessing algorithm in the video encoding pipeline is unlikely to be properly optimized to increase the overall effectiveness of the aggregated preprocessing operations and/or subsequent encoding operations performed within the conventional video encoding pipeline. As a result, for a given bitrate, the visual quality of a reconstructed video could be needlessly low. Conversely, the number of bits used during encoding to achieve a given visual quality level for a reconstructed video could be inordinately high.

With the disclosed techniques, however, a training application uses machine learning techniques to generate one or more trained preprocessors that reduce reconstruction errors when preprocessing images represented in a luma-chroma color space. The reconstruction errors correlate to an end-to-end loss of visual quality between a given source image and a reconstructed image derived from a preprocessed image. During training, the reconstruction errors can optionally be adjusted to account for any intentional modifications (e.g., removal of noise). designed to increase the effectiveness of lossy encoding algorithms. A luma-chroma color represents colors numerically via a luma component that represents brightness, and two chroma components (denoted herein as $chroma_1$ and $chroma_2$) that represent color. The training application can jointly or independently train one or more preprocessors to preprocess data corresponding to mutually exclusive sets of components.

In some embodiments, the training application generates a trained luma preprocessor, a trained $chroma_1$ preprocessor, and a trained $chroma_2$ preprocessor based on a downscaling factor and a chroma subsampling ratio. Notably, downscaling is akin to downsampling $chroma_1$ data, $chroma_2$ data, and luma data. By contrast, chroma subsampling is akin to downsampling $chroma_1$ data and $chroma_2$ data while leaving luma data unchanged. To coalesce downscaling and chroma subsampling, the training application sets an initial version of a luma preprocessor equal to an untrained convolutional neural network (CNN) that downsamples by the downscaling factor. By contrast, the training application sets initial versions of a $chroma_1$ preprocessor and a $chroma_2$ preprocessor equal to two instances of a untrained CNN that downsamples by a multiple of the downscaling factor, where the multiplier reflects the chroma subsampling ratio.

The training application then trains the luma preprocessor, the $chroma_1$ preprocessor, and the $chroma_2$ preprocessor based on discrete portions or "image patches" of any number of training images included in a training database. In some embodiments, the training images are frames of videos that reflect the primary use of a target video encoding pipeline (e.g., encoding animated high-resolution movies or encoding low-resolution video clips). If the training images are not in the luma-chroma color space, then the training application converts the training images to the luma-chroma color space when determining the image patches. The training application can perform any number and/or type of machine learning training operations on the luma preprocessor, the $chroma_1$ preprocessor, and the $chroma_2$ preprocessor to reduce model-specific reconstruction errors for luma data, $chroma_1$ data, and $chroma_2$ data, respectively, or joint reconstruction errors for image patches. In some embodiments, and as described in greater detail below in conjunction with FIG. 2, the training application computes any number and/or types of reconstruction errors based on any number and/or types of loss functions, cost functions, objective functions, or any combination thereof. In the same or other embodiments, the training application computes any number and/or types of reconstruction errors based on any number and/or types of differentiable loss functions, cost functions, objective functions, or any combination thereof that incorporate directionality and/or regional information to reduce any number and/or types of distortions, such as color bleeding, edge distortions, etc.

In some embodiments, to compute a joint reconstruction error for a given image patch, the training application inputs the corresponding luma data, chroma$_1$ data, and chroma$_2$ data into the luma preprocessor, the chroma$_1$ preprocessor, and the chroma$_2$ preprocessor, respectively. In response, the luma preprocessor, the chroma$_1$ preprocessor, and the chroma$_2$ preprocessor generate preprocessed luma data, preprocessed chroma$_1$ data, and preprocessed chroma$_2$ data, respectively. Subsequently, the training application configures and applies different instances of a configurable upsampling algorithm to the preprocessed luma data, the preprocessed chroma$_1$ data, and the preprocessed chroma$_2$ data. The resulting reconstructed luma data, reconstructed chroma$_1$ data, and reconstructed chroma$_2$ data have the same resolution as the luma data, the chroma$_1$ data, and the chroma$_2$ data, respectively. The training application aggregates the reconstructed luma data, the reconstructed chroma$_1$ data, and the reconstructed chroma$_2$ data to generate a reconstructed patch. In some embodiments, the training application sets a joint reconstruction error for the image patch equal to the mean squared error of the reconstructed patch relative to the image patch.

After computing an average joint reconstruction error based on the reconstruction errors for a batch of image patches, the training application individually updates the parameters of each of the preprocessors based on the average joint reconstruction loss. After the training is complete, the training application stores the final versions of the chroma$_1$ preprocessor, the chroma$_2$ preprocessor, and the luma preprocessor in a trained machine learning (ML) model database as a trained chroma$_1$ preprocessor, a trained chroma$_2$ preprocessor, and a trained luma preprocessor, respectively.

In some embodiments, an image preprocessing application can use one or more of any number and/or types of trained preprocessors and optionally any number and/or types of non-ML preprocessors to perform component-based preprocessing of source images. As referred to herein, in "component-based preprocessing," preprocessed luma data is generated separately from preprocessed chroma data, and preprocessed chroma$_1$ data and preprocessed chroma$_2$ data can be generated jointly or separately. In operation, if a source image is not in the luma-chroma color space, the image preprocessing application converts the source image into the luma-chroma color space. In some embodiments, the image preprocessing application inputs the luma data, the chroma$_1$ data, and the chroma$_2$ data corresponding to the source image into the trained luma preprocessor, the trained chroma$_1$ preprocessor, and the trained chroma$_2$ preprocessor, respectively. In response, the trained luma preprocessor, the trained chroma$_1$ preprocessor, and the trained chroma$_2$ preprocessor generate preprocessed luma data, preprocessed chroma$_1$ data, and preprocessed chroma$_2$ data, respectively. The image preprocessing application aggregates the preprocessed luma data, the preprocessed chroma$_1$ data, and the preprocessed chroma$_2$ data to generate a preprocessed image. The image preprocessing application then stores the preprocessed image in any memory and/or transmits the preprocessed image to any number of software applications (e.g., an image encoder or a video encoder).

At least one technical advantage of the disclosed techniques relative to the prior art is that the disclosed techniques can be implemented in a video encoding pipeline to mitigate the visual quality reductions typically experienced with conventional video encoding pipelines. In that regard, the training application trains one or more ML models to reduce reconstruction errors when preprocessing at least one of chroma$_1$ data, chroma$_2$ data, or luma data. The reconstruction errors correlate to decreases in the visual quality of reconstructed images included in reconstructed videos attributable to preprocessing source images within a video encoding pipeline. Thus, relative to prior art techniques, these trained ML models(s) can be used by the image preprocessing application within a video encoding pipeline to increase the effectiveness of the video encoding pipeline. Increasing the effectiveness of a video encoding pipeline can lead to an increase in the visual quality level of a reconstructed video derived from an encoded video having a given bitrate. Conversely, increasing the effectiveness of a video encoding pipeline can decrease the minimum bitrate required to achieve a target visual quality level. Another technical advantage of the disclosed techniques is that the training application can generate different trained preprocessor(s) that are fine-tuned for different types of images (e.g., images in an animated film). Accordingly, when preprocessing images of a given type, the image preprocessing application can use the trained preprocessor(s) that are fine-tuned for that image type, which increases the effectiveness of the related preprocessing operations. These technical advantages provide one or more technological improvements over prior art approaches.

System Overview

FIG. 1 is a conceptual illustration of a system 100 configured to implement one or more aspects of the various embodiments. For explanatory purposes, multiple instances or versions of like objects are denoted with reference numbers identifying the object and parenthetical alphanumeric character(s) identifying the instance or version where needed. As shown, in some embodiments, the system 100 includes, without limitation, a compute instance 110(1), a compute instance 110(2), an untrained/pre-trained model database 102, a training image database 104, and a trained model database 140.

In some other embodiments, the system 100 can omit the compute instance 110(1), the compute instance 110(2), the untrained/pre-trained model database 102, the training image database 104, the trained model database 140, or any combination thereof. In the same or other embodiments, the system 100 can include, without limitation, one or more other compute instances, any number and/or types of other databases, or any combination thereof. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each of the compute instances 110 can be implemented in a cloud computing environment, implemented as part of any other distributed computing environment, or implemented in a stand-alone fashion.

The processor 112 can be any instruction execution system, apparatus, or device capable of executing instructions. For example, the processor 112 could comprise a central processing unit, a graphics processing unit, a controller, a microcontroller, a state machine, or any combination thereof. The memory 116 of the compute instance 110 stores content, such as software applications and data, for use by the processor 112 of the compute instance 110. The memory 116 can be one or more of a readily available memory, such as random-access memory, read-only memory, floppy disk, hard disk, or any other form of digital storage, local or remote.

In some other embodiments, each of any number of compute instances 110 can include any number of processors 112 and any number of memories 116 in any combination. In particular, any number of compute instances 110 (including one) can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing In general, each compute instance 110 is configured to implement one or more software applications. For explanatory purposes only, each software application is described as residing in the memory 116 of a single compute instance 110 and executing on the processor 112 of the single compute instances 110. However, in some embodiments, the functionality of each software application can be distributed across any number of other software applications that reside in the memories 116 of any number of compute instances 110 and execute on the processors 112 of any number of compute instances 110 in any combination. Further, the functionality of any number of software applications can be consolidated into a single software application.

In some embodiments, a video preprocessing application 180 and optionally a video encoder 196 reside in the memory 116(2) of the compute instance 110(2) and execute on the processor 112(2) of the compute instance 110(2). In some embodiments, the video preprocessing application 180 and the video encoder 196 are collectively referred to as a "video encoding pipeline."

As shown, in some embodiments, the video encoding pipeline generates an encoded video 198 based on a source video 170. The source video 170 includes, without limitation, any amount and/or types of video content. Some examples of video content are any portion (including all) of feature-length films, episodes of television programs, and music videos, to name a few. The video content of source video 170 is organized as a sequence of source images 172. Each of the source images 172 is an image or "frame" that includes, without limitation any amount and/or type of image content.

Although not shown, in some embodiments, the encoded video 198 is transmitted to a playback device. An endpoint application executing on the playback device decodes the encoded video 198 to generate a decoded video. The endpoint application performs any number (including none) and/or types of sampling operations (e.g., upsampling operations or downsampling operations) on the encoded video 198 to generate a reconstructed video having the same resolution as a display device. The endpoint application plays back the reconstructed video.

As described previously herein, a typical video encoding pipeline includes, without limitation, a sequence of one or more preprocessing algorithms followed by a lossy encoding algorithm that is implemented in the video encoder. Each of the preprocessing algorithms in the video encoding pipeline independently implements a different type of image preprocessing to preemptively eliminate information from the images in a video in an effort to increase the effectiveness of the lossy encoding algorithm. Some examples of types of image preprocessing include, without limitation, downscaling, chroma subsampling, and denoising. One drawback of such a video encoding pipeline is that the preprocessing algorithms are neither designed nor optimized to operate as part of the video encoding pipeline. As a result, a reduction in the visual quality of a reconstructed video that is attributable to the video encoding pipeline can be unnecessarily high.

Using Machine Learning Techniques to Preprocess Images

To address the above problems, the system 100 includes, without limitation, a training application 130 that uses machine learning techniques to generate trained preprocessors that reduce reconstruction errors when preprocessing components of images. In some embodiments, a reconstruction error is a value for any type of metric that correlates to an end-to-end loss of visual quality between a given source image and a reconstructed version of the source image. In the same or other embodiments, a reconstruction error is determined based on any number and/or types of metrics that take into account one or more aspects of visual quality. In some embodiments, one goal is to reduce color bleeding when preprocessing components of images, and a reconstruction error is determined, at least in part, based on a metric that measures color bleeding resulting from color subsampling. In the same or other embodiments, one goal is to reduce edge distortions when preprocessing components of images, and a reconstruction error is determined, at least in part, based on a metric that measures edge distortions.

Because the human visual system is less sensitive to color than to brightness, the training application 130 enables component-based image preprocessing. More specifically, the training application 130 can train different machine learning (ML) models to preprocess data corresponding to different subsets of the components of a luma-chroma color space. Furthermore, each trained ML model or "trained preprocessor" generated by the training application 130 can consolidate any amount and/or types of preprocessing on data corresponding to the associated component subset. And the training images used to train a given ML model can be selected such that the resulting trained preprocessor is fine-tuned for images and/or videos having specific characteristics.

The luma-chroma color space can be any color space that represents colors numerically via a luma component that represents brightness, and two chroma components that represent color. For explanatory purposes, "luma component," "$chroma_1$ component," and "$chroma_2$ component" are used herein to denote the components of the luma-chroma color space. Similarly, the terms "luma data," "$chroma_1$ data," and "$chroma_2$ data" are used herein to refer to data corresponding to the luma component, the $chroma_1$ component, and the $chroma_2$ component, respectively. $Chroma_1$ data and $chroma_2$ data are also referred to herein individually and collectively as "chroma data."

An image represented in a luma-chroma color space includes, without limitation, at least one of luma data, $chroma_1$ data, and $chroma_2$ data. An image that includes only luma data, only chroma data, or only $chroma_2$ data is a monochrome image. Luma data, $chroma_1$ data, and $chroma_2$ data can correspond to any portion (including all) of any type of image (e.g., one of the source images 172) and/or any type of video.

In some embodiments, each image and each video can be associated with any technically feasible combination of any number and/or types of color-related characteristics. Some examples of color-related characteristics include, without limitation, dynamic range, color gamut, and bit-depth. For instance, in some embodiments, the source video 170 is a High Dynamic Range (HDR)/Wide Color Gamut (WCG) video having a bit-depth of 16 bits per component, and each of the source images 172 is an HDR/WCG image having a bit-depth of 16 bits per component. In some other embodiments, the source video 170 is a Standard Dynamic Range (SDR) video having a bit-depth of 8 bits per component, and each of the source images 172 is an SDR image having a bit-depth of 8 bits per component.

The luma-chroma color space can provide a non-constant luminance representation or a constant luminance representation. In a non-constant luminance representation, modifying the chroma data of an image is relatively likely to perceptibly impact the brightness of the image. An example of a luma-chroma color space that provides a non-constant luminance representation is the Y'CbCr color space. If the luma-chroma color space is the Y'CbCr color space, then the luma component is a gamma-compressed brightness component denoted "Y'," the $chroma_1$ component is the blue-difference chroma component denoted "Cb," and the $chroma_2$ component is the red-difference chroma component denoted "Cr."

By contrast, in a constant luminance representation modifying the chroma data of an image is relatively unlikely to perceptibly impact the brightness of the image. Accordingly, some embodiments implement a luma-chroma color space providing a constant luminance representation to increase the effectiveness of chroma-specific preprocessing, such as chroma subsampling. An example of a luma-chroma color space that provides a constant luminance representation is the ICtCp color space. If the luma-chroma color space is the ICtCp color space, then the luma component is the intensity component denoted "I," the $chroma_1$ component is the blue-yellow chroma component denoted "Ct," and the $chroma_2$ component is the red-green component denoted "Cp."

As shown, in some embodiments, the training application 130 resides in the memory 116(1) of the compute instance 110(1) and executes on the processor 112(1) of the compute instance 110(1). In the same or other embodiments, the training application 130 generates a trained luma preprocessor 142, a trained $chroma_1$ preprocessor 144, and a trained $chroma_2$ preprocessor 146 based on an untrained/pre-trained model database 102, a training image database 104, and a preprocessing specification 120(0). The preprocessing specification 120(0) describes, without limitation, any amount and/or types of preprocessing that is to be implemented in one or more associated trained preprocessors.

As shown, in some embodiments, the preprocessing specification 120(0) includes, without limitation, a downscaling factor 122(0), a chroma subsampling ratio 124(0), optionally a denoising type 126(0), and optionally any amount and/or type of other data associated with any preprocessing. The downscaling factor 122(0) specifies a factor by which the resolutions of luma data, $chroma_1$ data, and $chroma_2$ data are to be decreased. In some embodiments, the chroma subsampling ratio is a triplet that is denoted "4:h:v," where h and v specify the relative number of values corresponding to each chroma component in rows of a conceptual 4×2 pixel block. In some embodiments, the denoising type 126(0) specifies whether spatial denoising is to be applied to all data, only luma data, only chroma data, or no data.

The training image database 104 includes, without limitation, any number and/or types of training images. In some embodiments, the training images can be represented in any type of color space, and the training application 130 performs any number and or types of operations on the training images to determine any amount and/or types of training data in the luma-chroma color space. For instance, in some embodiments, the training images are represented in a linear RGB color space or a non-linear RGB color space and the training application 130 determines luma data, $chroma_1$ data, and $chroma_2$ data corresponding to multiple "patches" of each training image.

In some embodiments, the training images in the training image database 104 share one or more characteristics. In the same or other embodiments, the training application 130 selects any number of training images from the training image database 104 and/or any number of other training databases based on one or more target characteristics and disregards the remaining training images. In some embodiments, the training application 130 trains one or more untrained or pre-trained ML models based on a selected subset of available training images to generate corresponding trained preprocessors that are fine-tuned for images and/or videos similar to the selected subset of training images.

The untrained/pre-trained model database 102 includes, without limitation, any number and/or types of ML models. For instance, in some embodiments, the untrained/pre-trained model database 102 includes any number of convolutional neural networks (CNNs). In the same or other embodiments, any number of CNNs can be configurable, and the architecture of any number of CNNs can vary based on associated types of preprocessing. In some embodiments, the training application 130 is configured to generate multiple trained preprocessors corresponding to different downsampling factors. In the same or other embodiments, multiple trained luma preprocessors corresponding to different downsampling factors are implemented in an adaptive multi-network architecture in an image preprocessing application 150.

Each of the trained luma preprocessor 142, the trained $chroma_1$ preprocessor 144, and the trained $chroma_2$ preprocessor 146 can implement any number and/or types of preprocessing. For instance, in some embodiments, the trained luma preprocessor 142, the trained $chroma_1$ preprocessor 144, and the trained $chroma_2$ preprocessor 146 each implement both downsampling and spatial denoising. In some other embodiments, the trained luma preprocessor 142 implements both downscaling and spatial denoising, and each of the trained $chroma_1$ preprocessor 144 and the trained $chroma_2$ preprocessor 146 implement both downscaling and chroma subsampling.

Although not shown, in some embodiments, the training application 130 generates a joint chroma preprocessor that jointly preprocesses $chroma_1$ data and $chroma_2$ data. In some other embodiments, the training application 130 generates a single chroma preprocessor that can be used to independently process $chroma_1$ data and $chroma_2$ data.

In some embodiments, the trained luma preprocessor 142 generates preprocessed luma data for a preprocessed image based on luma data, optionally $chroma_1$ data, and optionally $chroma_2$ data for an image. In the same or other embodiments, the trained $chroma_1$ preprocessor 144 generates preprocessed $chroma_1$ data for a preprocessed image based on chroma$_1$ data, optionally luma data, and optionally chroma$_2$ data for an image. In some embodiments, the trained chroma$_2$ preprocessor 146 generates preprocessed chroma$_2$ data for a preprocessed image based on chroma$_2$ data, optionally luma data, and optionally chroma$_1$ data for an image.

The training application 130 can implement any amount and/or type of machine learning techniques to train any type of untrained or pre-trained machine learning models based on any criteria in any technically feasible fashion. As described in greater detail below in conjunction with FIG. 2, in some embodiments, the training application 130 implements an iterative training process based on any number and/or types of loss functions, cost functions, objective functions, or any combination thereof.

In some embodiments, after generating a trained preprocessor, the training application 130 stores the trained preprocessor in a trained model database 140 and optionally any number and/or types of associated characteristics in any technically feasible fashion. In the same or other embodiments, the training application 130 stores the trained preprocessor in any number and/or types of other memories and/or transmits the trained preprocessor to any number and/or types of software application.

As shown, in some embodiments, the training application 130 stores the trained luma preprocessor 142, the trained chroma$_1$ preprocessor 144, and the trained chroma$_2$ preprocessor 146 in a trained model database 140. In the same or other embodiments, the training application optionally associated the trained luma preprocessor 142, the trained chroma$_1$ preprocessor 144, and the trained chroma$_2$ preprocessor 146 with the luma component, the chroma$_1$ component, and the chroma$_2$ component, respectively.

In some embodiments, an image preprocessing application 150 and optionally an image encoder 192 reside in the memory 116(2) of the compute instance 110(2) and execute on the processor 112(2) of the compute instance 110(2). In the same or other embodiments, the image preprocessing application 150 uses any number and/or types of trained preprocessors and/or non-ML preprocessors 106 to perform component-based preprocessing on any number of source images as per a preprocessing specification 120(1) to generate corresponding preprocessed images.

In some embodiments, the image preprocessor performs component-based image preprocessing based on one or more mutually exclusive component set(s) that collectively specify the luma, chroma$_1$, and chroma$_2$ components of the luma-chroma color space. The image preprocessor can determine the component set(s) in any technically feasible fashion. In some embodiments, the image preprocessor determines the component set(s) based on the preprocessing specification 120(1). In some other embodiments, the image preprocessing application 150 implements predefined component set(s).

For each component set, the image preprocessing application 150 determines an associated spatial preprocessor (not shown) that is capable of preprocessing data corresponding to the component set per the preprocessing specification 120(1). In some embodiments, each spatial preprocessor includes, without limitation, a trained preprocessor, one or more non-ML preprocessors 106, or any combination thereof. The image preprocessing application 150 can determine the spatial preprocessor(s) in any technically feasible fashion.

In some embodiments, the image preprocessing application 150 implements predefined spatial preprocessor(s). In some other embodiments, the image preprocessing application 150 selects and aggregates one or more preprocessor(s) to generate each spatial preprocessor. In the same or other embodiments, the image preprocessing application 150 selects the preprocessor(s) from the trained model database 140 and optionally any number of non-ML preprocessors 106 based on the preprocessing specification 120(1). In some embodiments, the image preprocessing application 150 uses the same spatial preprocessor(s) to preprocess any number of source images to generate corresponding encoded source images.

For explanatory purposes, the operations the image preprocessing application 150 performs on each of any number of source images are described and depicted (via dashed arrows) herein in the context of preprocessing a source image 108. In some embodiments, the source image 108 can be represented in any type of color space, and the image preprocessing application 150 performs any number and or types of operations on the source image 108 to determine luma data, chroma$_1$ data, and chroma$_2$ data corresponding to the source image 108.

The image preprocessing application 150 causes each spatial preprocessor to generate preprocessed data corresponding to the associated component set based on at least one of the luma data, the chroma$_1$ data, or the chroma$_2$ data. In some embodiments, the training application 130 aggregates the preprocessed luma data, the preprocessed chroma$_1$ data, and the preprocessed chroma$_2$ data to generate a preprocessed image 158 that is a preprocessed version of the source image 108. In some embodiments, the image preprocessing application 150 stores preprocessed image 158 in any number and/or types of memories. In the same or other embodiments, the image preprocessing application 150 transmits the preprocessed image 158 to any number and/or types of software applications.

In some embodiment, the image preprocessing application 150 transmits the preprocessed image 158 to the image encoder 192. The image encoder 192 performs any number and/or types of operations on the preprocessed image 158 to generate an encoded image 194. In some embodiments, the image encoder 192 stores the encoded image 194 in any number and/or types of memories. In the same or other embodiments, the image encoder 192 transmits the encoded image 194 to any number and/or types of software applications. In some embodiments, the image preprocessing application 150 and the image encoder 192 are collectively referred to as an "image encoding pipeline."

In some embodiments, the video preprocessing application 180 uses the image preprocessing application 150 to perform component-based encoding on a source video 170 based on the preprocessing specification 120(1). As shown, in some embodiments, the video preprocessing application 180 includes, without limitation, a spatial preprocessing engine 182 and optionally a temporal preprocessing engine 184.

In operation, the spatial preprocessing engine 182 splits the source video 170 into source images 172. In some embodiments, the source video 170 can be represented in any type of color space. and therefore the source images 172 are not represented in the luma-chroma color space. In the same or other embodiments, and as described previously herein, the image preprocessing application 150 can preprocess source images in any type of color space. The spatial preprocessing engine 182 transmits the source images 172 and the preprocessing specification 120(1) to the image preprocessing application 150. In response, the image preprocessing application 150 preprocesses the source images 172 to generate preprocessed images 178.

As shown, in some embodiments, the video preprocessing application 180 does not implement temporally preprocessing, and the video preprocessing application 180 aggregates the preprocessed images 178 to generate the preprocessed video 188. In some other embodiments, the video preprocessing application 180 aggregates the preprocessed images 178 to generate a spatially preprocessed video (not shown). The temporal preprocessing engine 184 performs any number and/or types of temporal preprocessing (e.g., temporal denoising, interlace removal, etc.) on the spatially preprocessed video to generate the preprocessed video 188.

In some embodiments, the video preprocessing application 180 stores the preprocessed video 188 in any number and/or types of memories. In the same or other embodiments, the video preprocessing application 180 transmits the preprocessed video 188 to any number and/or types of software applications. As shown, in some embodiments, the video preprocessing application 180 transmits the preprocessed video 188 to the video encoder 196, and the video encoder 196 encodes the preprocessed video 188 to generate the encoded video 198. In some embodiments, the video encoder 196 stores the encoded video 198 and/or transmits the encoded video 198 to any number of software applications.

Note that the techniques described herein are illustrative rather than restrictive and may be altered without departing from the broader spirit and scope of the invention. Many modifications and variations on the functionality provided by the training application 130, the image preprocessing application 150, the video preprocessing application 180, the spatial preprocessing engine 182, the temporal preprocessing engine 184, the image encoder 192, the video encoder 196, the trained preprocessors, the untrained ML models, and the pre-trained ML models will be apparent to those of ordinary skill in the art without departing from the scope and spirit of the described embodiments.

It will be appreciated that the system 100 shown herein is illustrative and that variations and modifications are possible. For instance, the connection topology between the various components in FIG. 1 may be modified as desired. For instance, in some embodiments, the image preprocessing application 150 is integrated into the video preprocessing application 180. In some other embodiments, the video preprocessing application 180 and the video encoder 196 are omitted from the system 100.

Generating Different Trained Preprocessors for Different Components

Figure 2:
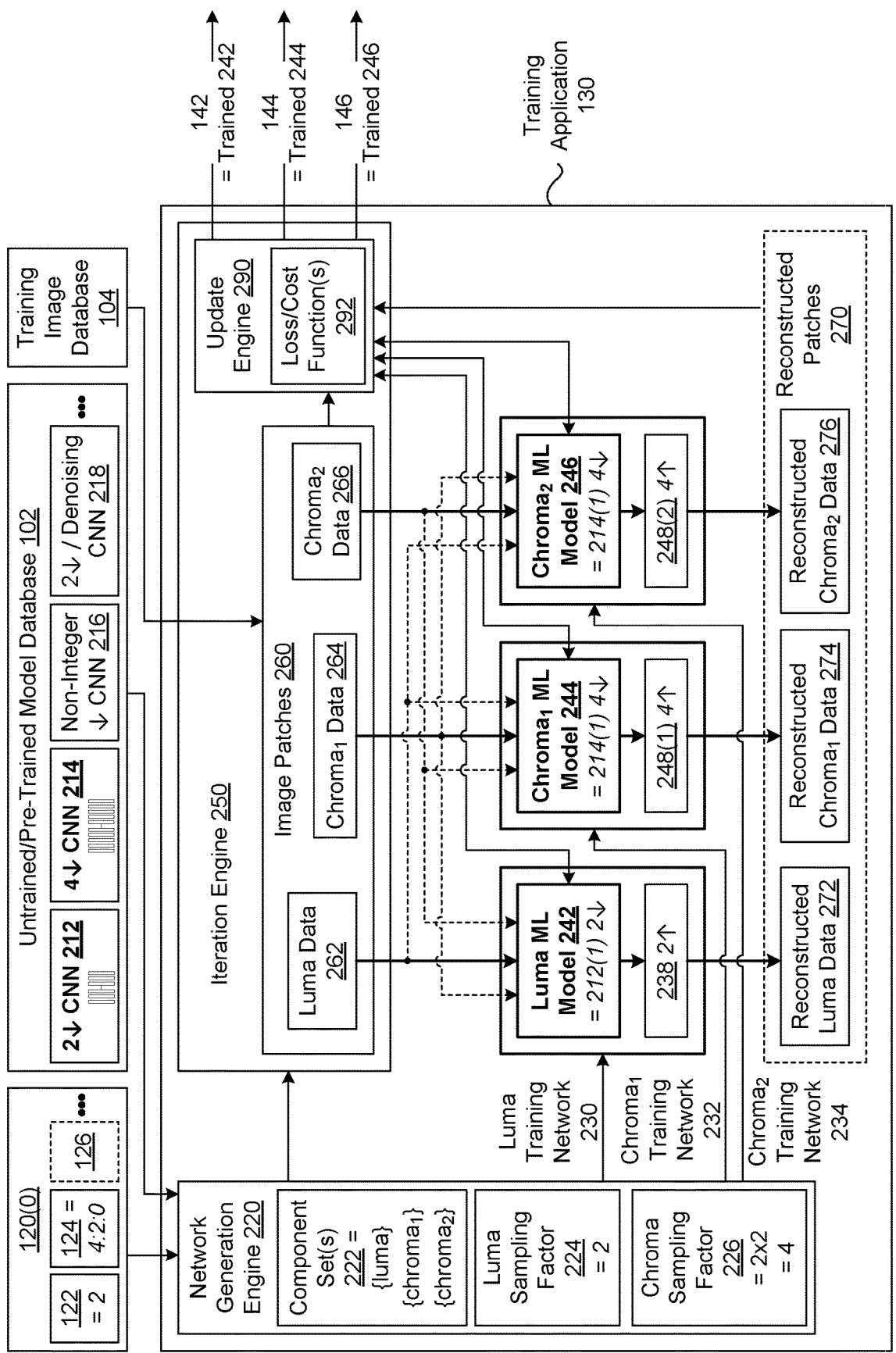
FIG. 2 is an exemplar illustration of the training application of FIG. 1, according to various embodiments.

FIG. 2 is an exemplar illustration of the training application 130 of FIG. 1, according to various embodiments. More specifically, the training application 130 depicted in FIG. 2 generates the trained luma preprocessor 142, the trained chroma$_1$ preprocessor 144, and the trained chroma$_2$ preprocessor 146 based on the untrained/pre-trained model database 102, the training image database 104, and the preprocessing specification 120(0). In some other embodiments, the training application 130 can generate any number and/or types of preprocessors.

Figure 5:
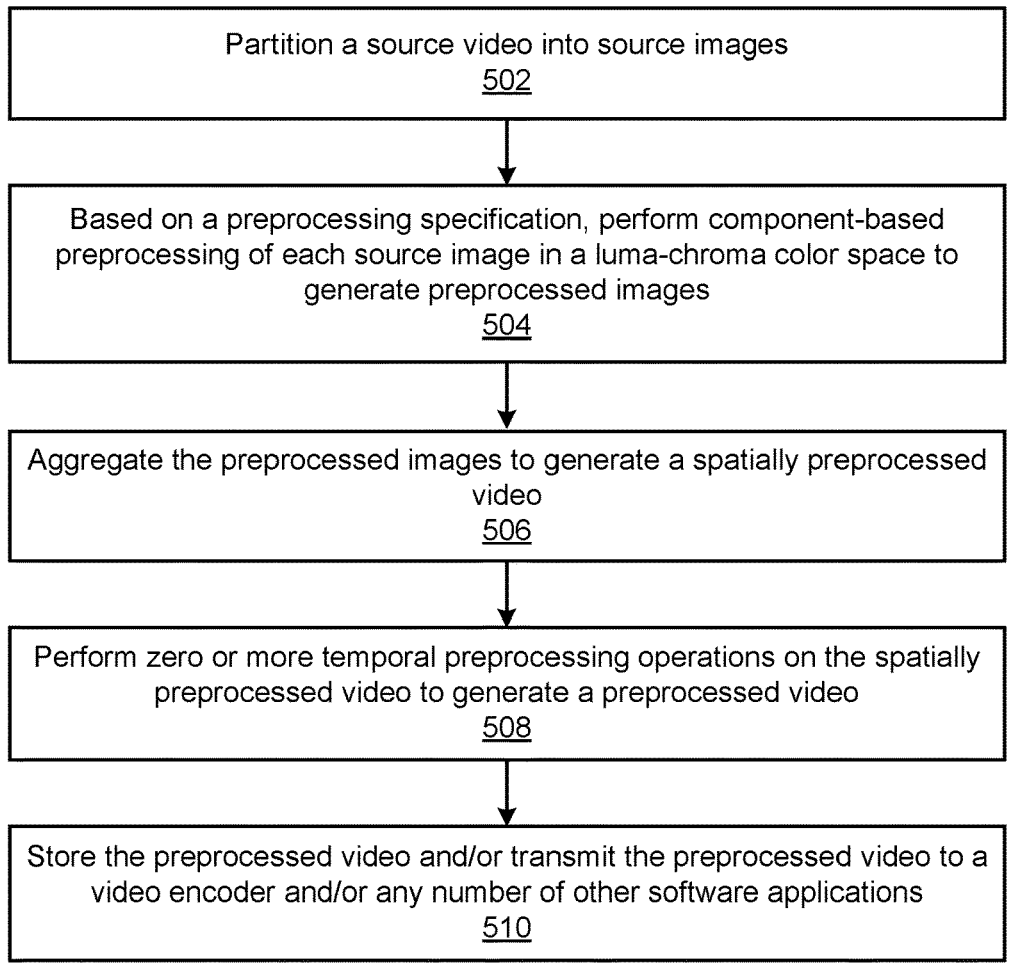
FIG. 5 is a flow diagram of method steps for preprocessing a source video, according to various embodiments.

For explanatory purposes only, in the context of FIGS. 2 and 5, the symbol "↓" denotes downsampling, "2↑" denotes 2× downsampling, and "4↑" denotes 4× downsampling. In a complementary fashion, "↑" denotes upsampling, "2↑" denotes 2× upsampling, and "4↑" denotes 4× upsampling. As shown, in some embodiments, the untrained/pre-trained model database 102 includes, without limitation, a 2× downsampling CNN 212, a 4× downsampling CNN 214, a non-integer downsampling CNN 216, and a 2× downsampling/denoising CNN 218, zero or more other CNNs, and zero or more other types of ML models. In some embodiments, each of the 2× zero or more other types of ML models. In some embodiments, each of the 2× downsampling CNN 212, the 4× downsampling CNN 214, the non-integer downsampling CNN 216, and the 2× downsampling/denoising CNN 218 are untrained.

In some embodiments, the architecture of the ML models included in the untrained/pre-trained model database 102 can vary. As visually depicted via thumbnails, in some embodiments, the 2× downsampling CNN 212 has fewer layers than the 4× downsampling CNN 214. In some embodiments, any number of the ML models included in the untrained/pre-trained model database 102 can be configured and/or customized prior to training in any technically feasible fashion. For instance, in some embodiments, the non-integer downsampling CNN 216 can be configured via an associated non-integer downsampling factor.

In some embodiments, each ML model included in the untrained/pre-trained model database 102 includes, without limitation, any number and/or types of parameters that the training application 130 can update during training to reduce reconstruction errors when preprocessing components of images. For instance, in some embodiments, each of the 2× downsampling CNN 212, the 4× downsampling CNN 214, the non-integer downsampling CNN 216, and the non-integer downsampling CNN 216 includes, without limitation, an upsampling/identity residual block and a downsampling residual block. As referred to herein, a "residual block" is a portion of a CNN that maps the input of the residual block to a residual and then adds the residual to a function of the input of the residual block to generate the output of the residual block. Both the upsampling/identity residual block and the downsampling residual block include, without limitation, one or more parameters that the training application can modify to mitigate a reduction in visual quality associated with a loss of data that is inherent in downsampling.

As shown, in some embodiments, the training application 130 includes, without limitation, a network generation engine 220, and an iteration engine 250. In some embodiments, the network generation engine 220 configures one or more training networks based on the untrained/pre-trained model database 102 and the preprocessing specification 120(0). In the same or other embodiments, the network generation engine 220 includes, without limitation, component set(s) 222, a luma sampling factor 224, and a chroma sampling factor 226.

The component set(s) 222 include, without limitation, one or more mutually exclusive component sets, where each component set specifies one or more of the luma component, the chroma$_1$ component, and the chroma$_2$ component. The network generation engine 220 can determine the component set(s) 222 in any technically feasible fashion. For instance, in some embodiments, the network generation engine 220 determines the component set(s) 222 based on the preprocessing specification 120(0). In some embodiments, for each component set included in the component set(s) 222, the training application 130 generates a different trained preprocessor that preprocesses data corresponding to the one or more components specified in the component set.

As shown, in some embodiments, including the embodiment depicted in FIG. 2, each component set is a singleton specifying a different component of the luma-chroma color space and therefore the component set(s) 222 include, without limitation, {luma}, {chroma$_1$}, and {chroma$_2$}. In the same or other embodiments, if the component set(s) 222 are {luma}, {chroma$_1$}, and {chroma$_2$}, then the training application 130 generates the trained luma preprocessor 142, the trained chroma$_1$ preprocessor 144, the trained chroma$_2$ preprocessor 146. By contrast, if the component set(s) 222 are {chroma$_1$} and {chroma$_2$}, then the training application 130 generates the trained chroma$_1$ preprocessor 144 and the trained chroma$_2$ preprocessor 146 but does not generate the trained luma preprocessor 142. If the component set(s) 222 are the component set {chroma$_1$, chroma$_2$}, then the training application 130 generates a trained joint chroma preprocessor (not shown) that jointly preprocesses chroma$_1$ data and chroma$_2$ data.

In some embodiments, each trained preprocessor generates preprocessed data corresponding to the components specified in the associated component set based on at least source data corresponding to at least the components specified in the associated component set and optionally any number of other source data. For instance, in some embodiments, the trained chroma$_2$ preprocessor 146 generates preprocessed data corresponding to the chroma$_1$ component based on data corresponding to the chroma$_1$ component and optionally the chroma$_2$ component and/or the luma component. In some embodiments, a joint chroma preprocessor generates preprocessed data corresponding to the chroma$_1$ component and the chroma$_2$ component based on data corresponding to the chroma$_1$ component and the chroma$_2$ component, and optionally the luma component.

In some embodiments, the luma sampling factor 224 specifies consolidated downsizing that is to be applied to luma data, and the chroma sampling factor 226 specifies consolidated downsizing that is to be applied to chroma data. In the same or other embodiments, because downsizing but not chroma subsampling reduces the size of luma data, the network generation engine 220 sets the luma sampling factor 224 equal to the downscaling factor 122(0). In some embodiments, because downscaling and chroma subsampling both reduce the size of chroma data, the training application 130 sets the chroma sampling factor 226 equal to an overall downsizing of chroma data that reflects both downscaling and chroma subsampling.

For instance, as depicted in italics, in some embodiments, the downscaling factor 122(0) is 2 and the chroma subsampling ratio 124(0) is 4:2:0. The downscaling factor 122(0) of 2 corresponds to a downsizing of luma data by a factor of 2 and the chroma subsampling rate does not impact the size of luma data. Accordingly, the network generation engine 220 set the luma sampling factor 224 equal to the downscaling factor 122(0) of 2. The downscaling factor 122(0) of 2 corresponds to a downsizing of chroma data by a factor of 2. And as persons skilled in the art will recognize, an image having equal resolutions for all components corresponds to a chroma subsampling ratio of 4:4:4. Relative to a "default" source image having a chroma subsampling ratio of 4:4:4, the chroma subsampling ratio 124(0) of 4:2:0 corresponds to a downsizing of chroma data by a factor of two. In some embodiments, to reflect default source images, the network generation engine 220, therefore, sets the luma sampling factor 224 equal to 4.

As the above example illustrates, in some embodiments, the network generation engine 220 can implement arbitrarily different downscaling factors for luma data and chroma data via the luma sampling factor 224 and the chroma sampling factor 226. For instance, in some embodiments, the network generation engine 220 can consolidate any downscaling factor (including none) with any conversion from one chroma subsampling ratio to another chroma subsampling ratio. Some examples of chroma subsampling factors include 2:0, 4:2:2, 4:2:1, 4:1:1, 4:01:0, and 3:1:1.

For each of the component set(s) 222, the network generation engine 220 selects and optionally configures an initial version of a corresponding ML model from the untrained/pre-trained model database 102 based on the luma sampling factor 224, the chroma sampling factor 226, and any other relevant preprocessing-related data (e.g., the denoising type 126(0). For explanatory purposes, and as depicted in italics, in some embodiments, the network generation engine 220 sets a luma ML model 242 equal to the 2× downsampling CNN 212 based on the luma sampling factor 224 of 2. In the same or other embodiments, the network generation engine 220 sets each of a chroma$_1$ ML model 244 and a chroma$_2$ ML model 246 equal to a different instance of the 4× downsampling CNN 214 based on the chroma sampling factor 226 of 4.

In some embodiments, for each component set, the network generation engine 220 implements a reconstruction function based on the corresponding ML model and appends the reconstruction function to the ML model to generate the associated training network. In some embodiments, each reconstruction function is a differentiable upsampling algorithm. The network generation engine 220 can implement any differentiable upsampling algorithm in any technically feasible fashion. Some examples of differentiable upsampling algorithms include, without limitation, bicubic upsampling algorithms and bilinear upsampling algorithms. In some embodiments, because endpoint applications executing on playback devices often perform bicubic or bicubic-like upsampling on encoded videos, the differentiable upsampling algorithm is a differentiable bicubic or a differentiable bicubic-like upsampling algorithm. In the same or other embodiments, for each component set, the network generation engine 220 configures the differentiable upsampling algorithm to upsample by the sampling factor associated with the corresponding ML model.

For instance, as depicted in italics, in some embodiments, the network generation engine 220 implements a differentiable upsampling algorithm that is configured to upsample by a factor of 2 as a luma reconstruction function 238. The network generation engine 220 appends the luma reconstruction function 238 to the luma ML model 242 to generate a luma training network 230. The network generation engine 220 implements two instances of a differentiable upsampling algorithm that is configured to upsample by a factor of 4 as a chroma reconstruction function 248(1) and a chroma reconstruction function 248(2). The network generation engine 220 appends the chroma reconstruction function 248(1) to the chroma$_1$ ML model 244 to generate a chroma$_1$ training network 232. The network generation engine 220 appends the chroma reconstruction function 248(2) to the chroma$_2$ ML model 246 to generate a chroma$_2$ training network 234.

The iteration engine 250 implements any number and/or types of machine learning techniques to train the ML models included in the ML training networks. In some embodiments, the iteration engine 250 includes, without limitation, image patches 260 and an update engine 290. In some embodiments, the iteration engine 250 performs any number and/or types of operations on any number of on training images included in the training image database 104 to determine luma data 262, chroma$_1$ data 264, and chroma$_2$ data 266 corresponding to any number of image patches 260. Each image patch can be any portion (including all) of any type of image.

In some embodiments, the iteration engine 250 distributes the image patches 260 across any number of batches and executes batch iterations for any number of epochs. To execute a batch iteration for a given batch, the iteration engine 250 selects the image patches in the batch. For each selected image patch, the iteration engine 250 configures each training network to generate reconstructed data corresponding to the associated component set based on data corresponding to the selected image patch and at least the associated component set.

As shown, in some embodiments, the iteration engine 250 inputs the luma data 262, optionally the chroma$_1$ data 264, and optionally the chroma$_2$ data 266 corresponding to the selected image patch into the luma ML model 242. In response, the luma ML model 242 downsamples the luma data 262 by a factor of 2 to generate preprocessed luma data (not shown). The luma reconstruction function 238 upsamples the preprocessed luma data by a factor of 2 to generate reconstructed luma data 272 derived from the selected image patch.

In the same or other embodiments, the iteration engine 250 inputs the chroma$_1$ data 264, optionally the luma data 262, and optionally the chroma$_2$ data 266 corresponding to the selected image patch into the chroma$_1$ ML model 244. In response, the chroma$_1$ ML model 244 downsamples the chroma$_1$ data 264 by a factor of 4 to generate preprocessed chroma$_1$ data (not shown). The chroma reconstruction function 248(1) upsamples the preprocessed chroma$_1$ data by a factor of 4 to generate reconstructed chroma$_1$ data 274 derived from the selected image patch.

In the same or other embodiments, the iteration engine 250 inputs the chroma$_2$ data 266, optionally the luma data 262, and optionally the chroma$_1$ data 264 corresponding to the selected image patch into the chroma$_2$ ML model 246. In response, the chroma$_2$ ML model 246 downsamples the chroma$_2$ data 266 by a factor of 4 to generate preprocessed chroma$_2$ data (not shown). The chroma reconstruction function 248(2) upsamples the preprocessed chroma$_2$ data by a factor of 4 to generate reconstructed chroma$_2$ data 276 derived from the selected image patch.

In some embodiments, the reconstructed luma data 272, the reconstructed chroma$_1$ data 274, and reconstructed chroma$_2$ data 276 derived from a given selected image patch define a reconstructed patch corresponding to the selected image patch. In some embodiments, the reconstructed patches 270 includes, without limitation, one or more of the reconstructed patches.

Based on the reconstructed data corresponding to the selected image patch, the update engine 290 computes a different reconstruction error for each of the ML models or a single joint reconstruction error. In the same or other embodiments, a reconstruction error is a value for any type of metric that correlates to an end-to-end loss of visual quality between a given source image and a reconstructed version of the source image. In the same or other embodiments, the reconstruction error is modified to take into account the impact of denoising or any other type of preprocessing that intentionally modifies the source image to increase the effectiveness of encoding.

In some embodiments, the update engine 290 computes a batch reconstruction error for each batch based on the reconstruction errors for the selected images in the batch. In the same or other embodiments, the update engine 290 can update the parameters of the ML models independently based on different batch reconstruction errors or jointly based on joint batch reconstruction errors. As persons skilled in the art will recognize, independently updating the parameters of the ML models corresponds to independently training the ML models, while jointly updating the parameters of the ML models corresponds to jointly training the ML models.

The update engine 290 can compute the reconstruction error(s) and the batch reconstruction error(s) in any technically feasible fashion. For instance, in some embodiments, the update engine 290 can compute reconstruction error(s) and/or batch reconstruction error(s) using one or more loss functions, one or more cost functions, one or more objective functions, one or more other functions, or any combination thereof.

As shown, in some embodiments, the update engine 290 computes reconstruction error(s) and batch reconstruction error(s) using loss/cost function(s) 292. The loss/cost function(s) 292 include, without limitation, any number of loss functions and any number of cost functions, where each loss function and each cost function is associated with one or more of the ML models. In some embodiments, each loss function and an associated cost function can be used to compute reconstruction error(s) known as "loss(es)" and associated batch reconstruction error(s) known as "cost(s)" corresponding to one or more of the luma component, the chroma$_1$ component, or the chroma$_2$ component.

For instance, in some embodiments, the loss/cost functions(s) 292 include, without limitation, a luma loss function, a luma cost function, a chroma$_1$ loss function, a chroma$_1$ cost function, a chroma$_2$ loss function, and a chroma$_2$ cost function. For each selected image patch, the update engine 290 uses the luma loss function to set a luma loss for the selected image patch equal to the mean squared error of the corresponding reconstructed luma data relative to the corresponding luma data. And, for each selected image patch, the update engine 290 uses the chroma$_1$ loss function to set a chroma$_1$ loss for the selected image patch equal to the mean squared error of the corresponding reconstructed chroma$_1$ data relative to the corresponding chroma$_1$ data. Similarly, for each selected image patch, the update engine 290 uses the chroma$_2$ loss function to set a chroma$_2$ loss for the selected image patch equal to the mean squared error of the corresponding reconstructed chroma$_2$ data relative to the corresponding chroma$_2$ data.

In the same or other embodiments, after computing the luma loss for the last selected image patch in each batch, the update engine 290 sets a luma cost equal to the average of the luma losses of the selected image patches in the batch. And after computing the chroma$_1$ loss for the last selected image patch in each batch, the update engine 290 sets a chroma$_1$ cost equal to the average of the chroma$_1$ losses of the of the selected image patches in the batch. Similarly, after computing the chroma$_2$ loss for the last selected image patch in each batch, the update engine 290 sets a chroma$_2$ cost equal to the average of the chroma$_2$ losses of the of the selected image patches in the batch.

In some other embodiments, the loss/cost functions(s) 292 include, without limitation, a joint loss function and a joint cost function. For each selected image patch, the update engine 290 uses the joint loss function to set a joint loss for the selected image patch equal to the mean squared error of the corresponding reconstructed patch relative to the selected image patch. In the same or other embodiments, after computing the joint loss for the last selected image patch in each batch, the update engine 290 sets a joint cost equal to the average of the joint losses of the selected image patches in the batch.

In the same or other embodiments, the update engine 290 updates the parameters of the ML models included in the training networks based on any number and/or types of operations performed in a color space other than the luma-chroma color space in which the preprocessing is performed. For instance, in some embodiments, the preprocessing is performed in a non-linear luma-chroma color space, and the update engine 290 computes losses based on an objective function that is defined with respect to a linear luminance-chrominance color space, a linear RGB color space, or a non-linear RGB color space.

To complete each batch iteration, the update engine 290 individually updates the parameters of each ML model included in the training networks based on the associated batch reconstruction error to generate a new version of the ML model that is better optimized to the goal of reducing the associated batch reconstruction error. For instance, in some embodiments, the update engine 290 updates the parameters of the luma ML model 242, the chroma$_1$ ML model 244, and the chroma$_2$ ML model 246 based on the luma cost, the chroma$_1$ cost, and the chroma$_2$ cost, respectively, for the batch. In some other embodiments, the update engine 290 updates the parameters of the luma ML model 242, the chroma$_1$ ML model 244, and the chroma$_2$ ML model 246 based on the joint cost for the batch.

The update engine 290 can update the parameters for each ML model based on a corresponding batch reconstruction error or a joint batch reconstruction error in any technically feasible fashion. For instance, in some embodiments, the update engine 290 performs any number of backpropagation operations and any number of gradient descent operations on an ML model to update any number of the parameters of the ML model based on a corresponding batch reconstruction error or a joint batch reconstruction error.

In some embodiments, after the update engine 290 finishes executing the last epoch, the training engine stores the most recent version of each of the ML models included in the training networks in the trained model database 140 as a trained preprocessor for the associated component set that is optionally associated with any number and/or types of characteristics. For instance, as shown, in some embodiments, the update engine 290 stores the luma ML model 242, the chroma$_1$ ML model 244, and the chroma$_2$ ML model 246 in the trained model database 140 as a trained luma preprocessor 142, a trained chroma$_1$ preprocessor 144, and a trained chroma$_2$ preprocessor 146, respectively.

Figure 3A:
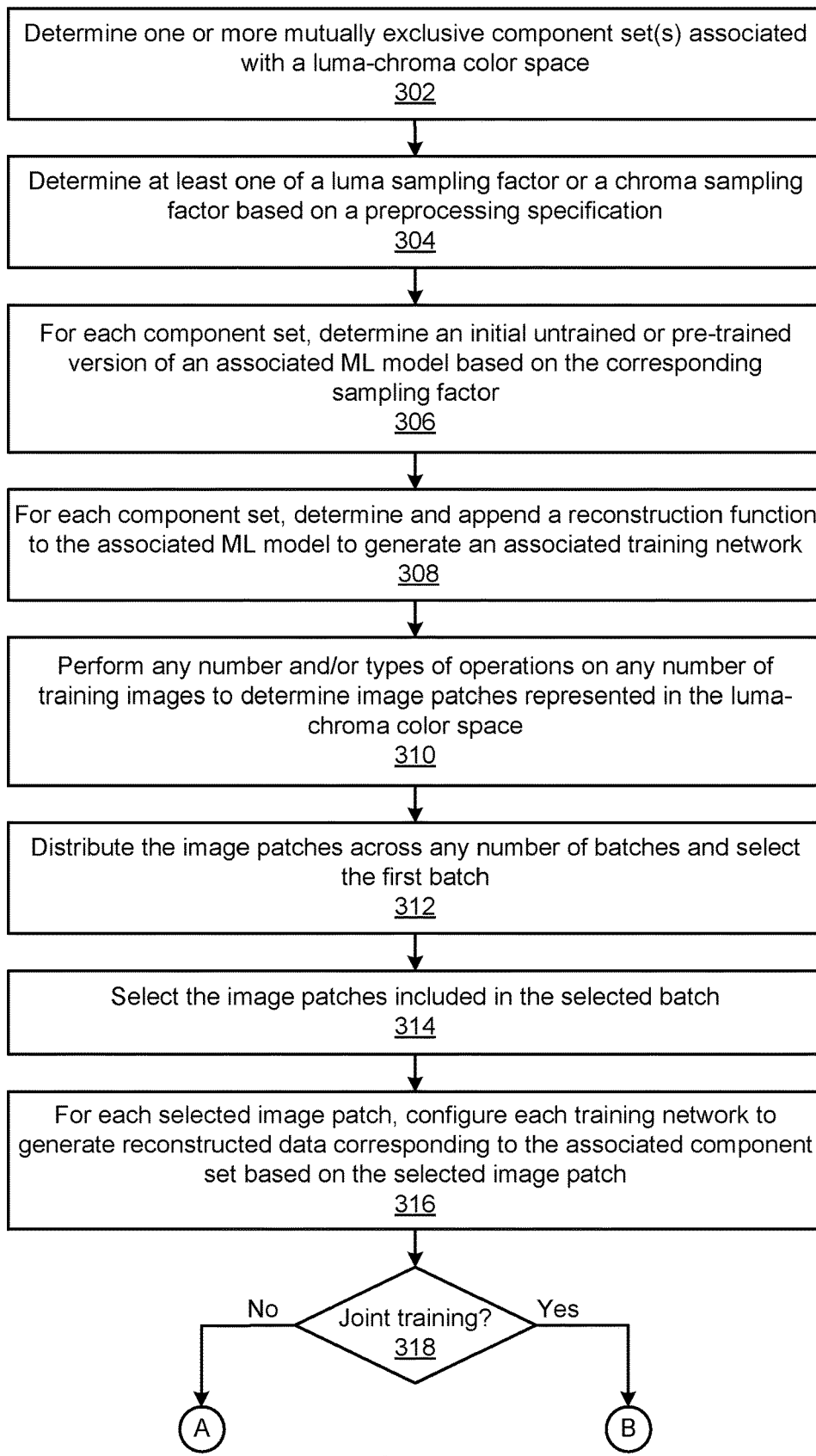
FIGS. 3A-3B set forth a flow diagram of method steps for training one or more machine learning models to preprocess images, according to various embodiments.
Figure 3B:
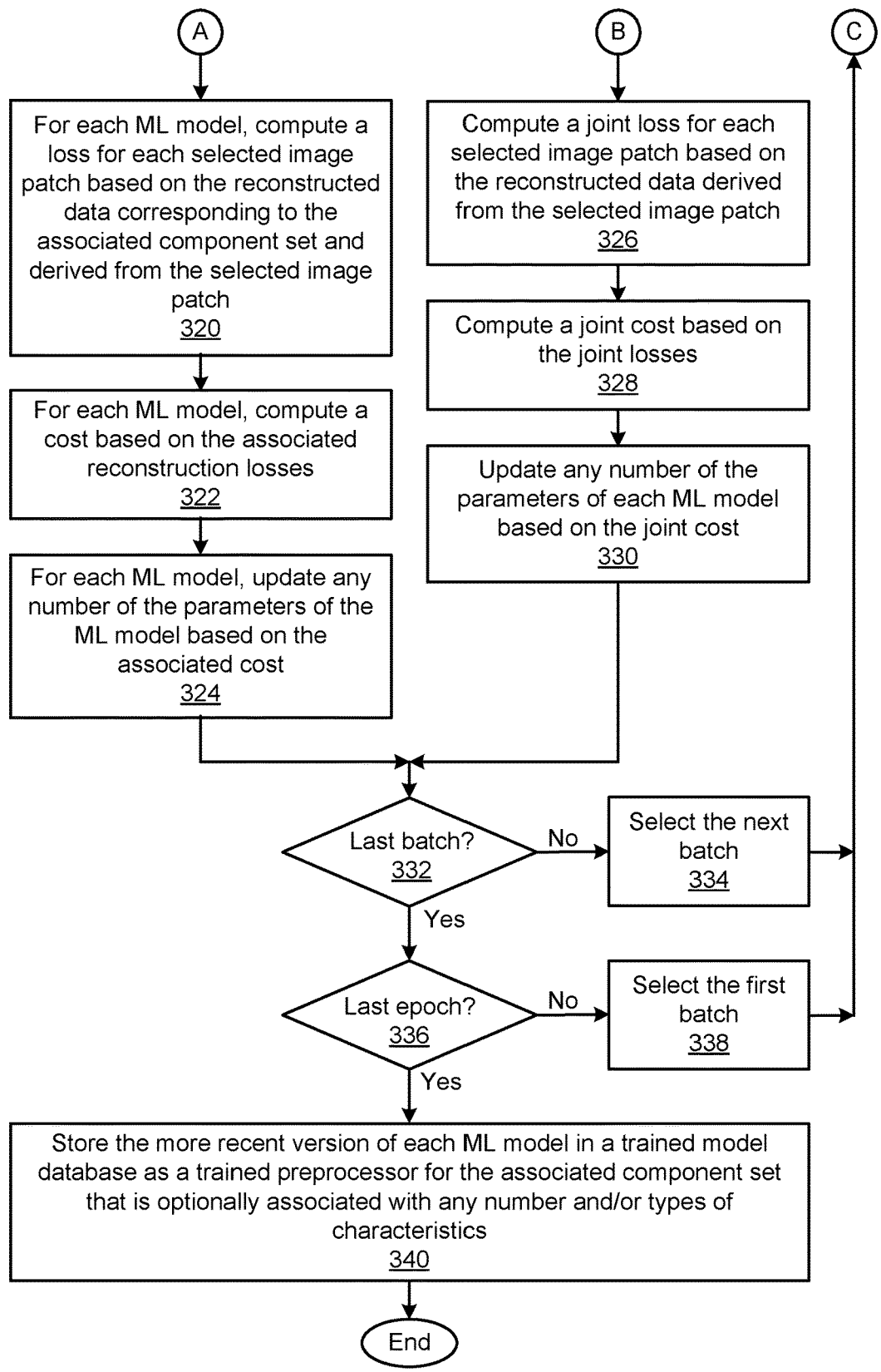

FIGS. 3A-3B set forth a flow diagram of method steps for training one or more machine learning models to preprocess images, according to various embodiments. Although the method steps are described with reference to the systems of FIGS. 1 and 2, persons skilled in the art will understand that any system configured to implement the method steps, in any order, falls within the scope of the embodiments.

As shown, a method 300 begins at step 302, where the training application 130 determines one or more mutually exclusive component set(s) 222 associated with a luma-chroma color space. The training application 130 can determine the component set(s) 222 in any technically feasible fashion. For instance, in some embodiments, the training application 130 determines the component set(s) 222 based on the preprocessing specification 120. At step 304, the training application 130 determines at least one of a luma sampling factor 224 or a chroma sampling factor 226 based on a preprocessing specification.

At step 306, for each component set, the training application 130 determines an initial untrained or pre-trained version of an associated ML model based on the corresponding scaling factor. At step 308, for each component set, the training application 130 determines and appends a reconstruction function to the associated ML model to generate an associated training network.

At step 310, the training application 130 performs any number and/or types of operations on any number of training images to determine image patches 260 represented in the luma-chroma color space. At step 312, the training application 130 distributes the image patches 260 across any number of batches and selects the first batch. At step 314, the training application 130 selects the image patches included in the selected batch. At step 316, for each selected image patch, the training application 130 configures each training network to generate reconstructed data corresponding to the associated component set based on the selected image patch.

At step 318, the training application 130 determines whether the training application 130 is to perform joint training of the ML model(s). At step 318, if the training application 130 determines that the training application 130 is not to perform joint training, then the method 300 proceeds to step 320. At step 320, for each ML model, the training application 130 computes a loss for each selected image patch based on the reconstructed data corresponding to the associated component set and derived from the selected image patch. At step 322, for each ML model, the training application 130 computes a cost based on the associated losses. At step 324, for each ML model, the training application 130 updates any number of the parameters of the ML model based on the associated iteration cost. The method 300 then proceeds directly to step 332.

If, however, at step 318, the training application 130 determines that the training application 130 is to perform joint training, then the method 300 proceeds directly to step 326. At step 326, the training application 130 computes a joint loss for each selected image patch based on the reconstructed data derived from the selected image patch. At step 328, the training application 130 computes a joint cost based on the joint losses. At step 330, the training application 130 updates any number of the parameters of each ML model based on the joint cost.

At step 332, the training application 130 determines whether the selected batch is the last batch. If, at step 332, the training application 130 determines that the selected batch is not the last batch, then the method 300 proceeds to step 334. At step 334, the training application 130 selects the next batch, and the method 300 returns to step 314, where the training application 130 selects the image patches included in the selected batch.

If, however, at step 332, the training application 130 determines that the selected batch is the last batch, then the method 300 proceeds directly to step 336. At step 336, the training application 130 determines whether the current epoch is the last epoch. If, at step 336, the training application 130 determines that the current epoch is not the last epoch, then the method 300 proceeds to step 338. At step 338, the training application 130 selects the first batch, and the method 300 returns to step 314, where the training application 130 selects the image patches included in the selected batch.

If, however, at step 336, the training application 130 determines that the current epoch is the last epoch, then the method 300 proceeds directly to step 340. At step 340, the training application 130 stores the more recent version of each ML model in a trained model database as a trained preprocessor for the associated component set that is optionally associated with any number and/or types of characteristics. The method 300 then terminates.

Component-Based Image Preprocessing

Figure 4:
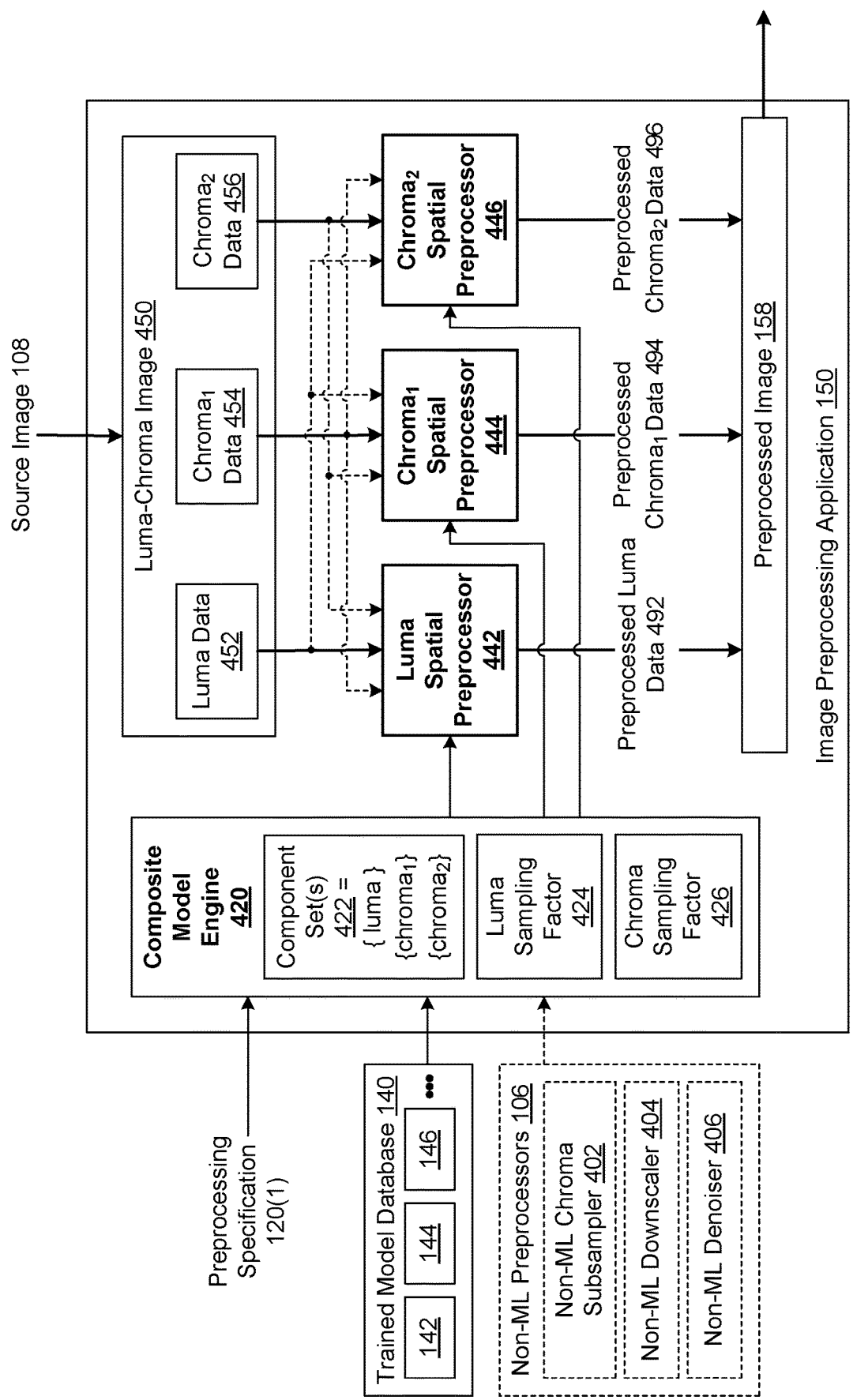
FIG. 4 is an exemplar illustration of the image preprocessing application of FIG. 1, according to various embodiments.

FIG. 4 is an exemplar illustration of the image preprocessing application 150 of FIG. 1, according to various embodiments. More specifically, the image preprocessing application 150 depicted in FIG. 5 implements a luma spatial preprocessor 442, a chroma$_1$ spatial preprocessor 444, and a chroma$_2$ spatial preprocessor 446 that independently preprocess luma data, chroma$_1$ data, and chroma$_2$ data, respectively. In some other embodiments, the image preprocessing application 150 can implement fewer spatial preprocessors, and at least one of the spatial preprocessors jointly preprocesses multiple components of the luma-chroma color space.

As shown, in some embodiments, the image preprocessing application 150 includes, without limitation, a composite model engine 420, the luma spatial preprocessor 442, the chroma$_1$ spatial preprocessor 444, the chroma$_2$ spatial preprocessor 446, and a luma-chroma image 450. In the same or other embodiments, the composite model engine 420 generates one or more spatial preprocessors based on the preprocessing specification 120(1), the trained model database 140, and optionally the non-ML preprocessors 106.

The preprocessing specification 120(1) and the preprocessing specification 120(0) described previously herein in conjunction with FIGS. 1 and 2 are different instances of a generic preprocessing specification that can have different values. In some embodiments, the trained model database 140 includes, without limitation, the trained luma preprocessor 142, the trained chroma$_1$ preprocessor 144, and the trained chroma$_2$ preprocessor 146. In the same or other embodiments, the non-ML preprocessors 106 include, without limitation, a non-ML chroma subsampler 402, a non-ML downsampler 404, and a non-ML denoiser 406.

As shown, in some embodiments, the composite model engine 420 includes, without limitation, component set(s) 422, a luma sampling factor 424, and a chroma sampling factor 426. The component set(s) 422 include, without limitation, one or more mutually exclusive component sets that, collectively, specify the luma component, the chroma$_1$ component, and the chroma$_2$ component. The composite model engine 420 can determine the component set(s) 422 in any technically feasible fashion. For instance, in some embodiments, the composite model engine 420 can determine the component set(s) 422 based on the preprocessing specification 120(1). In some embodiments, for each component set included in the component set(s) 422, the composite model engine 420 implements a different temporal preprocessor that preprocesses data corresponding to the one or more components specified in the component set.

As shown, in some embodiments, including the embodiment depicted in FIG. 4, each component set is a singleton specifying a different component of the luma-chroma color space and therefore the component set(s) 422 are {luma}, {chroma$_1$}, and {chroma$_2$}. In the same or other embodiments, based on the component set(s) 422 of {luma}, {chroma$_1$}, and {chroma$_2$}, the composite model engine 420 implements the luma spatial preprocessor 442, the chroma$_1$ spatial preprocessor 444, and the chroma$_2$ spatial preprocessor 446. By contrast, in some other embodiments, based on the component set(s) 422 of {luma} and {chroma$_1$, chroma$_2$}, the training application 130 implements the luma spatial preprocessor 442 that preprocesses luma data and a joint spatial preprocessor (not shown) that jointly preprocesses chroma$_1$ data and chroma$_2$ data.

In some embodiments, the luma sampling factor 424 specifies consolidated downsizing that is to be applied to luma data, and the chroma sampling factor 426 specifies consolidated downsizing that is to be applied to chroma data.

The composite model engine 420 can determine the luma sampling factor 424 and the chroma sampling factor 426 in any technically feasible fashion. In some embodiments, the composite model engine 420 determines the luma sampling factor 424 and the chroma sampling factor 426 based on the preprocessing specification 120(1).

In the same or other embodiments, because downsizing but not chroma subsampling reduces the size of luma data, the composite model engine 420 sets the luma sampling factor 424 equal to the downscaling factor 122(1). And because downscaling and chroma subsampling both reduce the size of chroma data, the composite model engine 420 sets the chroma sampling factor 426 equal to an overall downsizing of chroma data that reflects downscaling and chroma subsampling.

In some embodiments, for each of the component set(s) 422, the composite model engine 420 determines a spatial preprocessor that complies with the preprocessing specification 120(1) and includes, without limitation, one or more trained preprocessors and/or one or more non-ML preprocessors. The composite model engine 420 can determine each spatial preprocessor in any technically feasible fashion. In some embodiments, to generate each spatial preprocessor, the composite model engine 420 attempts to determine a trained preprocessor from the trained model database 140 that implements the corresponding sampling factor (e.g., the luma sampling factor 424 or the chroma sampling factor 426) and any other specified preprocessing (e.g., denoising). If the composite model engine 420 fails to determine a single trained preprocessor that complies with the preprocessing specification 120(1), then the composite model engine 420 aggregates zero or more trained preprocessors and zero or more non-ML preprocessors 106 to generate the spatial preprocessor.

For explanatory purposes, the preprocessing the image preprocessing application 150 performs on each of any number of source images are described and depicted in FIG. 4 in the context of preprocessing the source image 108. In some embodiments, the source image 108 can be represented in any type of color space, and the image preprocessing application 150 performs any number and or types of operations on the source image 108 to determine luma-chroma image 450 that represents the source image 108 in the luma-chroma color space. As shown, the luma-chroma image 450 includes, without luma data 452, chroma$_1$ data 454, and chroma$_2$ data 456.

The image preprocessing application 150 configures each of the spatial preprocessor(s) to generate preprocessed data for the corresponding component set based on at least the data corresponding to the corresponding component set. As shown, in some embodiments, the image preprocessing application 150 inputs the luma data 452, optionally the chroma$_1$ data 454, and optionally the chroma$_2$ data 456 into the luma spatial preprocessor 442. In response, the luma spatial preprocessor 442 generates preprocessed luma data 492. In the same or other embodiments, the image preprocessing application 150 inputs the chroma$_1$ data 454, optionally the luma data 452, and optionally the chroma$_2$ data 456 into the chroma$_1$ spatial preprocessor 444. In response, the chroma$_1$ spatial preprocessor 444 generates preprocessed chroma$_1$ data 494. In the same or other embodiments, the image preprocessing application 150 inputs the chroma$_2$ data 456, optionally the luma data 452, and optionally the chroma$_1$ data 454 into the chroma$_2$ spatial preprocessor 446. In response, the chroma$_2$ spatial preprocessor 446 generates preprocessed chroma$_2$ data 496.

The image preprocessing application 150 aggregates the preprocessed luma data 492, the preprocessed chroma$_1$ data 494, and the preprocessed chroma$_2$ data 496 to generate the preprocessed image 158. The image preprocessing application 150 stores the preprocessed image 158 and/or transmits the preprocessed image 158 to any number of software applications.

FIG. 5 is a flow diagram of method steps for preprocessing a source video, according to various embodiments. Although the method steps are described with reference to the systems of FIGS. 1, 2, and 4, persons skilled in the art will understand that any system configured to implement the method steps, in any order, falls within the scope of the embodiments.

As shown, a method 500 begins at step 502, where the video preprocessing application 180 partitions the source video 170 into source images 172. At step 504, based on the preprocessing specification 120(1), the video preprocessing application 180 performs component-based preprocessing of the source images 172 in a luma-chroma color space to generate preprocessed images 178.

The video preprocessing application 180 can execute and/or cause the execution of any number and/or types of operations on the source images 172 to generate the preprocessed images 178 in any technically feasible fashion. For instance, in some embodiments, the video preprocessing application 180 transmits the source images 172 and the preprocessing specification 120(1) to the image preprocessing application 150 that implements the method steps described below in conjunction with FIG. 6 to generate the preprocessed images 178.

At step 506, the video preprocessing application 180 aggregates the preprocessed images 178 to generate a spatially preprocessed video. At step 508, the video preprocessing application 180 performs zero or more temporal preprocessing operations on the spatially preprocessed video to generate preprocessed video 188. At step 510, the video preprocessing application 180 stores the preprocessed video 188 and/or transmits the preprocessed video 188 to video encoder 196 and/or any number of other software applications. The method 500 then terminates.

Figure 6:
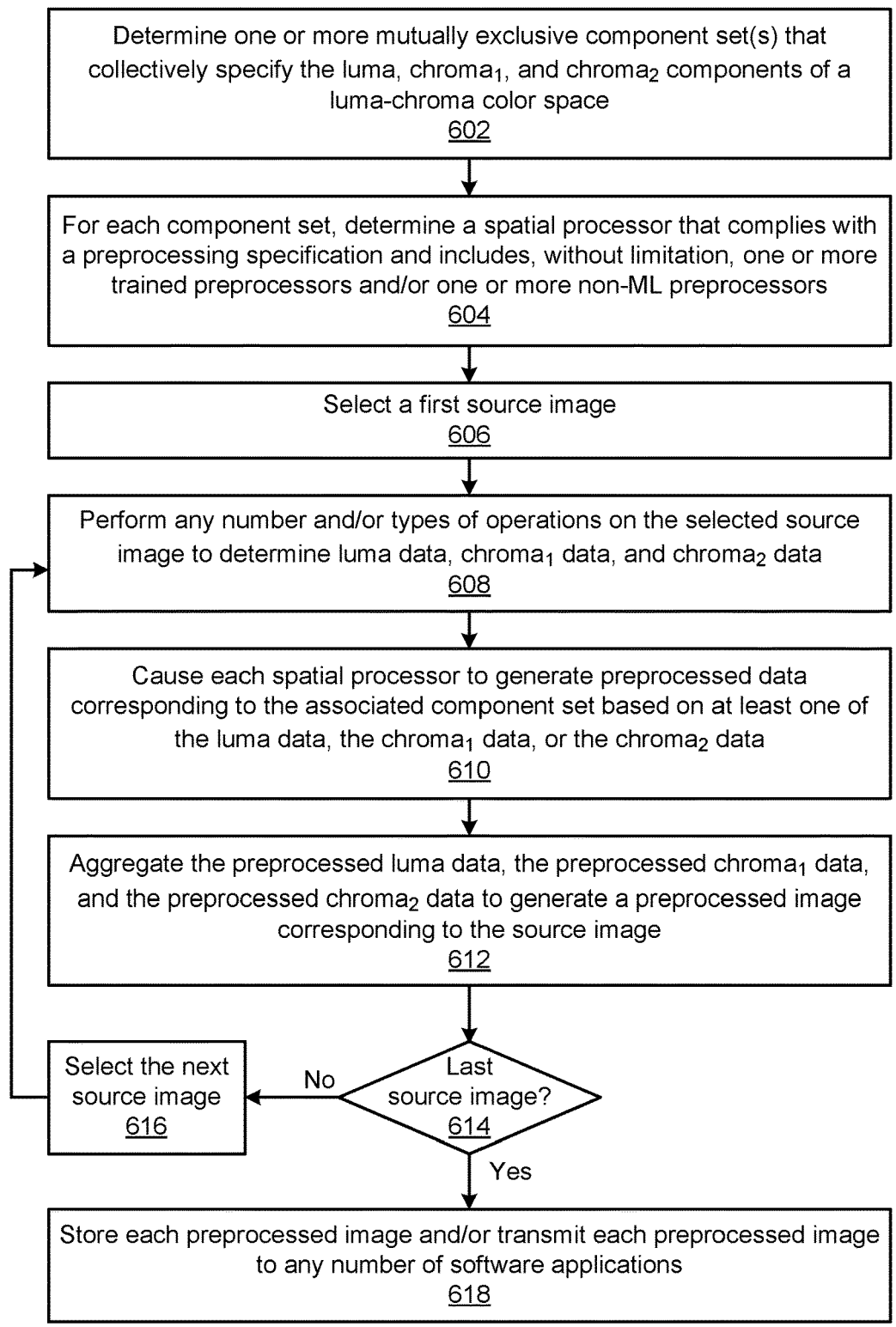
FIG. 6 is a flow diagram of method steps for preprocessing source images, according to various embodiments.

FIG. 6 is a flow diagram of method steps for preprocessing source images according to various embodiments. Although the method steps are described with reference to the systems of FIGS. 1, 2, and 4, persons skilled in the art will understand that any system configured to implement the method steps, in any order, falls within the scope of the embodiments.

As shown, a method 600 begins at step 602, where the image preprocessing application 150 determines one or more mutually exclusive component set(s) 422 that collectively specify the luma, chroma$_1$, and chroma$_2$ components of a luma-chroma color space. The image preprocessing application 150 can determine the component set(s) 422 in any technically feasible fashion. For instance, in some embodiments, the image preprocessing application 150 can determine the component set(s) 422 based on a preprocessing specification. In the same or other embodiments, each component set is a singleton specifying a different component of the luma-chroma color space. In some other embodiments, one component set is a singleton specifying the luma component of a luma-chroma color space and another component set specifying the two chroma components of the luma-chroma color space.

At step 604, for each component set, the image preprocessing application 150 determines a spatial preprocessor that complies with a preprocessing specification and includes, without limitation, one or more trained preprocessors and/or one or more non-ML preprocessors. At step 606, the image preprocessing application 150 selects a first source image. At step 608, the image preprocessing application 150 performs any number and/or types of operations on the selected source image to determine luma data, chroma$_1$ data, and chroma$_2$ data. At step 610, the image preprocessing application 150 causes each spatial preprocessor to generate preprocessed data corresponding to the associated component set based on at least one of the luma data, the chroma$_1$ data, and the chroma$_2$ data. At step 612, the image preprocessing application 150 aggregates the preprocessed luma data, the preprocessed chroma$_1$ data, and the preprocessed chroma$_2$ data to generate a preprocessed image corresponding to the source image.

At step 614, the image preprocessing application 150 determines whether the selected source image is the last source image. If, at step 614, the image preprocessing application 150 determines that the selected source image is not the last source image, then the method 600 proceeds to step 616. At step 616, the image preprocessing application 150 selects the next source image, and the method 600 returns to step 608, where the image preprocessing application 150 determines luma data, chroma$_1$ data, and chroma$_2$ data corresponding to the newly selected source image.

If, however, at step 616, the image preprocessing application 150 determines that the selected source image is the last source image, then the method 600 proceeds directly to step 618. At step 618, the image preprocessing application 150 stores each preprocessed image and/or transmits each preprocessed image to any number of software applications. The method 600 then terminates.

In sum, the disclosed techniques can be used to reduce an overall degradation in visual quality typically associated with streaming videos. In some embodiments, a training application generates a different trained preprocessor for each component of a luma-chroma color space based on a preprocessing specification and a training image database. The preprocessing specification includes, without limitation, a downscaling factor, a chroma subsampling ratio, and optionally specifies any amount and/or type of other preprocessing. The training application sets a luma sampling factor equal to the downscaling factor and computes a chroma sampling factor based on the luma sampling factor and the chroma subsampling ratio. In some embodiments, the training application determines untrained or pre-trained versions of a luma ML model, a chroma$_1$ ML model, or a chroma$_2$ ML model that downsample by the luma sampling factor, the chroma sampling factor, and the chroma sampling factor, respectively and optionally implement any other specified preprocessing. The training application generates a training network for each ML model that includes, without limitation, the ML model followed by an upsampling algorithm that upsamples by the scaling factor associated with the ML model.

In some embodiments, the training application performs any number of conversion and/or extraction operations on training images included in a training image database to generate luma data, chroma$_1$ data, and chroma$_2$ data corresponding to each of any number of image patches. The training application distributes the image patches across any number of batches and executes batch iterations for any number of epochs. To execute a batch iteration for a given batch, the training application selects the image patches in the batch. For each selected image patch, the training application inputs at least the corresponding luma data into the luma training network, at least the corresponding chroma₁ data into the chroma₁ training network, and at least the corresponding chroma₂ data into the chroma₁ training network. In response, for each selected image patch, the luma ML model, the chroma₁ ML model, and the chroma₂ ML models generate preprocessed luma data, preprocessed chroma₁ data, and preprocessed chroma₂ data, respectively. The upsampling algorithms in the luma training network, the chroma₁ training network, and the chroma₂ training network upsample the preprocessed luma data, preprocessed chroma₁ data, and preprocessed chroma₂ data, respectively, to generate reconstructed luma data, reconstructed chroma₁ data, and reconstructed chroma₂ data, respectively. The reconstructed luma data, reconstructed chroma₁ data, and reconstructed chroma₂ data define a reconstructed patch corresponding to the selected image patch.

For each of the selected image patches, the training application sets a joint loss equal to the mean squared error of the corresponding reconstructed patch relative to the selected image patch. The training application sets a joint cost equal to the average of the joint losses of the selected image patches. The training application individually updates the parameters of the luma ML model, the chroma₁ ML model, and the chroma₂ ML based on the joint cost to complete the batch iteration. After the training engine finishes executing the last epoch, the training engine stores the most recent version of the luma ML model, the chroma₁ ML model, and the chroma₂ ML model as a trained luma preprocessor, a trained chroma₁ preprocessor, and a trained chroma₂ preprocessor, respectively.

In the same or other embodiments, a video preprocessing application generates a preprocessed video based on a source video and a preprocessing specification. The video preprocessing application splits the source video into source images. The video preprocessing application transmits the source images and a preprocessing specification to an image preprocessing application. The image preprocessing application attempts to satisfy the preprocessing specification using a different trained preprocessor for each of a luma spatial preprocessor, a chroma₁ spatial preprocessor, and a chroma₂ spatial preprocessor equal to a trained preprocessor. If the image preprocessing application is unable to satisfy the preprocessing specification for a given component using a single trained preprocessor, then the image preprocessing application aggregates zero or more trained preprocessors and zero or more non-ML preprocessors to generate a corresponding spatial preprocessor. The image preprocessing application performs any number and/or types of conversion and/or extraction operations on each source image to determine luma data, chroma₁ data, and chroma₂ data that collectively represent the image in a luma-chroma color space.

For each source image, the image preprocessing application configures the luma spatial preprocessor to map at least the luma data corresponding to the source image to preprocessed luma data. The image preprocessing application configures the chroma₁ spatial preprocessor to map at least the chroma₁ data corresponding to the source image to preprocessed chroma₁ data. The image preprocessing application configures the chroma₂ spatial preprocessor to map at least the chroma₂ data corresponding to the source image to preprocessed chroma₂ data. The image preprocessing application aggregates the preprocessed luma data, the preprocessed chroma₁ data, and the preprocessed chroma₂ data to generate a preprocessed image that is derived from the source image. The image preprocessing application transmits the preprocessed images to the video preprocessing application. The video preprocessing application aggregates and optionally performs any number and/or types of temporal preprocessing operations on the preprocessed images to generate a preprocessed video.

At least one technical advantage of the disclosed techniques relative to the prior art is that the disclosed techniques can be implemented in a video encoding pipeline to mitigate the visual quality reductions typically experienced with conventional video encoding pipelines. In that regard, a trained preprocessor implemented in a video encoding pipeline learns to reduce reconstruction errors when preprocessing data corresponding to at least one component in a luma-chroma color space. The reconstruction errors correlate to decreases in the visual quality of reconstructed images attributable to preprocessing source images within a video encoding pipeline. Thus, with the disclosed techniques, the visual quality of a reconstructed video can be increased for a given bitrate relative to what can be achieved using prior art techniques. Conversely, with the disclosed techniques, the number of bits used when encoding a source video to achieve a given target visual quality can be reduced relative to what can be achieved using prior art techniques. Another technical advantage of the disclosed techniques is that the training application can generate different trained preprocessor(s) that are fine-tuned for different types of images (e.g., images in an animated film). Accordingly, when preprocessing images of a given type, the image preprocessing application can use the trained preprocessor(s) that are fine-tuned for that image type, which increases the effectiveness of the related preprocessing operations. These technical advantages provide one or more technological improvements over prior art approaches.

1. In some embodiments, a computer-implemented method for preprocessing images comprises executing a first trained machine learning model on first data corresponding to both a first image and a first set of components of a luma-chroma color space to generate first preprocessed data; executing at least one of a second trained machine learning model or a first non-machine learning algorithm on second data corresponding to both the first image and a second set of components of the luma-chroma color space to generate second preprocessed data; and aggregating at least the first preprocessed data and the second preprocessed data to generate a first preprocessed image.

2. The computer-implemented method of clause 1, wherein the first set of components includes at least one of a blue-difference component or a red-difference component, and the second set of components includes a luma component.

3. The computer-implemented method of clauses 1 or 2, further comprising executing the first trained machine learning model or a third trained machine learning model on third data corresponding to both the first image and a third set of components of the luma-chroma color space to generate third preprocessed data that is included in the first preprocessed image.

4. The computer-implemented method of any of clauses 1-3, wherein the first image is represented in an RGB color space, and further comprising converting at least a portion of the first image to the luma-chroma color space to determine the first data and the second data.

5. The computer-implemented method of any of clauses 1-4, further comprising identifying the first trained machine learning model based on a downscaling factor and at least one of a chroma subsampling ratio or a denoising type.

6. The computer-implemented method of any of clauses 1-5, wherein a first resolution of the first preprocessed data is not equal to a second resolution of the second preprocessed data.

7. The computer-implemented method of any of clauses 1-6, further comprising extracting the first image from a video.

8. The computer-implemented method of any of clauses 1-7, wherein the first non-machine learning algorithm comprises one of a downscaling algorithm, a chroma subsampling algorithm, or a spatial denoising algorithm.

9. The computer-implemented method of any of clauses 1-8, further comprising aggregating the first preprocessed image with at least a second preprocessed image to generate a spatially preprocessed video; and performing one or more temporal preprocessing operations on the spatially preprocessed video to generate a preprocessed video.

10. The computer-implemented method of any of clauses 1-9, further comprising encoding the preprocessed video to generate an encoded video.

11. In some embodiments, one or more non-transitory computer readable media include instructions that, when executed by one or more processors, cause the one or more processors to preprocess images by performing the steps of executing a first trained machine learning model on first data corresponding to both a first image and a first set of components of a luma-chroma color space to generate first preprocessed data; preprocessing second data corresponding to both the first image and a second set of components of the luma-chroma color space to generate second preprocessed data; and aggregating at least the first preprocessed data and the second preprocessed data to generate a first preprocessed image.

12. The one or more non-transitory computer readable media of clause 11, wherein the first set of components includes at least one of a blue-difference component or a red-difference component, and the second set of components includes a luma component.

13. The one or more non-transitory computer readable media of clauses 11 or 12, further comprising executing the first trained machine learning model or a second trained machine learning model on third data corresponding to both the first image and a third set of components of the luma-chroma color space to generate third preprocessed data that is included in the first preprocessed image.

14. The one or more non-transitory computer readable media of any of clauses 11-13, wherein the first image is represented in an RGB color space, and further comprising converting at least a portion of the first image to the luma-chroma color space to determine the first data and the second data.

15. The one or more non-transitory computer readable media of any of clauses 11-14, further comprising identifying the first trained machine learning model based on at least one of a downscaling factor or a chroma subsampling ratio.

16. The one or more non-transitory computer readable media of any of clauses 11-15, wherein a first resolution of the first preprocessed data is not equal to a second resolution of the second preprocessed data.

17. The one or more non-transitory computer readable media of any of clauses 11-16, wherein preprocessing the second data comprises executing a second trained machine learning model on the second data to generate downsampled data corresponding to at least one of a chroma subsampling factor or a downscaling factor; and executing a first non-machine learning algorithm on the downsampled data to generate the second preprocessed data.

18. The one or more non-transitory computer readable media of any of clauses 11-17, further comprising aggregating the first preprocessed image with at least a second preprocessed image to generate a spatially preprocessed video; and performing one or more temporal denoising operations on the spatially preprocessed video to generate a preprocessed video.

19. The one or more non-transitory computer readable media of any of clauses 11-18, further comprising encoding the first preprocessed image to generate an encoded image.

20. In some embodiments, a system comprises one or more memories storing instructions and one or more processors coupled to the one or more memories that, when executing the instructions, perform the steps of executing a first trained machine learning model on first data corresponding to both a first image and a first set of components of a luma-chroma color space to generate first preprocessed data; executing at least one of a second trained machine learning model or a first non-machine learning algorithm on second data corresponding to both the first image and a second set of components of the luma-chroma color space to generate second preprocessed data; and generating a first preprocessed image based on at least the first preprocessed data and the second preprocessed data.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer-readable media having computer-readable program codec embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer-readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for preprocessing images, the method comprising:
    preprocessing a first image using different preprocessors for components of a luma-chroma color space comprising a luma component, a first chroma component, and a second chroma component, wherein preprocessing the first image comprises:
        executing a first preprocessor comprising a first trained machine learning model on first data corresponding to both a first image and a first set of components of the luma-chroma color space comprising the first chroma component to generate first preprocessed data, wherein the first preprocessed data comprises a downscaling of the first data; and
        executing a second preprocessor comprising at least one of a second trained machine learning model or a first non-machine learning algorithm on second data corresponding to both the first image and a second set of components of the luma-chroma color space comprising the second chroma component to generate second preprocessed data, wherein the second preprocessed data comprises a downscaling of the second data;
    aggregating at least the first preprocessed data and the second preprocessed data to generate a first preprocessed image; and
    aggregating the first preprocessed image with at least a second preprocessed image to generate a spatially preprocessed video.

2. The computer-implemented method of claim 1, wherein the first set of components includes at least one of a blue-difference component or a red-difference component, and the first set of components further includes a luma component.

3. The computer-implemented method of claim 1, further comprising executing the first trained machine learning model or a third trained machine learning model on third data corresponding to both the first image and a third set of components of the luma-chroma color space to generate third preprocessed data that is included in the first preprocessed image.

4. The computer-implemented method of claim 1, wherein the first image is represented in an RGB color space, and further comprising converting at least a portion of the first image to the luma-chroma color space to determine the first data and the second data.

5. The computer-implemented method of claim 1, further comprising identifying the first trained machine learning model based on a downscaling factor and at least one of a chroma subsampling ratio or a denoising type.

6. The computer-implemented method of claim 1, wherein a first resolution of the first preprocessed data is not equal to a second resolution of the second preprocessed data.

7. The computer-implemented method of claim 1, further comprising extracting the first image from a video.

8. The computer-implemented method of claim 1, wherein the first non-machine learning algorithm comprises one of a downscaling algorithm, a chroma subsampling algorithm, or a spatial denoising algorithm.

9. The computer-implemented method of claim 1, further comprising:
    performing one or more temporal preprocessing operations on the spatially preprocessed video to generate a preprocessed video.

10. The computer-implemented method of claim 9, further comprising encoding the preprocessed video to generate an encoded video.

11. One or more non-transitory computer readable media including instructions that, when executed by one or more processors, cause the one or more processors to preprocess images by performing the steps of:
    preprocessing a first image using different preprocessors for components of a luma-chroma color space comprising a luma component, a first chroma component, and a second chroma component, wherein preprocessing the first image comprises:
        executing a first preprocessor comprising a first trained machine learning model on first data corresponding to both a first image and a first set of components of the luma-chroma color space comprising the first chroma component to generate first preprocessed data, wherein the first preprocessed data comprises a downscaling of the first data; and
        preprocessing, by a second preprocessor, second data corresponding to both the first image and a second set of components of the luma-chroma color space comprising the second chroma component to generate second preprocessed data, wherein the second preprocessed data comprises a downscaling of the second data;

aggregating at least the first preprocessed data and the second preprocessed data to generate a first preprocessed image; and aggregating the first preprocessed image with at least a second preprocessed image to generate a spatially preprocessed video.

12. The one or more non-transitory computer readable media of claim 11, wherein the first set of components includes at least one of a blue-difference component or a red-difference component.

13. The one or more non-transitory computer readable media of claim 11, further comprising executing the first trained machine learning model or a second trained machine learning model on third data corresponding to both the first image and a third set of components of the luma-chroma color space to generate third preprocessed data that is included in the first preprocessed image.

14. The one or more non-transitory computer readable media of claim 11, wherein the first image is represented in an RGB color space, and further comprising converting at least a portion of the first image to the luma-chroma color space to determine the first data and the second data.

15. The one or more non-transitory computer readable media of claim 11, further comprising identifying the first trained machine learning model based on at least one of a downscaling factor or a chroma subsampling ratio.

16. The one or more non-transitory computer readable media of claim 11, wherein a first resolution of the first preprocessed data is not equal to a second resolution of the second preprocessed data.

17. The one or more non-transitory computer readable media of claim 11, wherein preprocessing the second data comprises:

executing a second trained machine learning model on the second data to generate downsampled data corresponding to at least one of a chroma subsampling factor or a downscaling factor; and executing a first non-machine learning algorithm on the downsampled data to generate the second preprocessed data.

18. The one or more non-transitory computer readable media of claim 11, further comprising:

performing one or more temporal denoising operations on the spatially preprocessed video to generate a preprocessed video.

19. The one or more non-transitory computer readable media of claim 11, further comprising encoding the first preprocessed image to generate an encoded image.

20. A system comprising:

one or more memories storing instructions; and one or more processors coupled to the one or more memories that, when executing the instructions, perform the steps of:

preprocessing a first image using different preprocessors for components of a luma-chroma color space comprising a luma component, a first chroma component, and a second chroma component, wherein preprocessing the first image comprises:

executing a first preprocessor comprising a first trained machine learning model on first data corresponding to both a first image and a first set of components of the luma-chroma color space comprising the first chroma component to generate first preprocessed data, wherein the first preprocessed data comprises a downscaling of the first data; and executing a second preprocessor comprising at least one of a second trained machine learning model or a first non-machine learning algorithm on second data corresponding to both the first image and a second set of components of the luma-chroma color space comprising the second chroma component to generate second preprocessed data, wherein the second preprocessed data comprises a downscaling of the second data;

generating a first preprocessed image based on at least the first preprocessed data and the second preprocessed data; and aggregating the first preprocessed image with at least a second preprocessed image to generate a spatially preprocessed video.

21. The computer-implemented method of claim 1, wherein the first preprocessed data comprises the downscaling of the first data based on a luma sampling factor, and where the second preprocessed data comprises the downscaling of the second data based on a chroma sampling factor.

* * * * *